(12) United States Patent
Kocher et al.

(10) Patent No.: US 7,587,044 B2
(45) Date of Patent: Sep. 8, 2009

(54) DIFFERENTIAL POWER ANALYSIS METHOD AND APPARATUS

(75) Inventors: Paul C. Kocher, San Francisco, CA (US); Joshua M. Jaffe, San Francisco, CA (US); Benjamin C. Jun, Foster City, CA (US)

(73) Assignee: Cryptography Research, Inc., San Francisco, CA (US)

( * ) Notice: Subject to any disclaimer, the term of this patent is extended or adjusted under 35 U.S.C. 154(b) by 2097 days.

(21) Appl. No.: 10/005,105

(22) Filed: Dec. 3, 2001

(65) Prior Publication Data

US 2002/0124178 A1 Sep. 5, 2002

Related U.S. Application Data

(60) Continuation-in-part of application No. 09/930,836, filed on Aug. 15, 2001, which is a continuation-in-part of application No. 09/737,182, filed on Dec. 13, 2000, now Pat. No. 6,381,699, which is a continuation-in-part of application No. 09/326,222, filed on Jun. 3, 1999, now Pat. No. 6,327,661, which is a continuation of application No. 09/324,798, filed on Jun. 3, 1999, now Pat. No. 6,278,783, which is a division of application No. 09/224,682, filed on Dec. 31, 1998, now Pat. No. 6,304,658.

(60) Provisional application No. 60/089,529, filed on Jun. 15, 1998, provisional application No. 60/087,880, filed on Jun. 3, 1998, provisional application No. 60/087,826, filed on Jun. 3, 1998, provisional application No. 60/070,344, filed on Jan. 2, 1998.

(51) Int. Cl.
*H04L 9/00* (2006.01)
*G06F 21/00* (2006.01)

(52) U.S. Cl. .............................. 380/1; 380/37; 713/194
(58) Field of Classification Search ..................... 380/1, 380/37, 204, 207, 218, 252, 253, 254; 713/159, 713/172, 185, 194, 340; 726/9, 20, 25; 705/41, 705/65, 66
See application file for complete search history.

(56) References Cited

U.S. PATENT DOCUMENTS 1,657,411 A 2/1923 Scherbius (Continued)

FOREIGN PATENT DOCUMENTS

DE 195 11 298 A1 3/1995

(Continued)

OTHER PUBLICATIONS

Back, Adam, "Non-Interactive Forward Secrecy" Sep. 6, 1996.

(Continued)

*Primary Examiner*—Gilberto Barron, Jr.
*Assistant Examiner*—Abdulhakim Nobahar
(74) *Attorney, Agent, or Firm*—Sonnenschein Nath & Rosenthal LLP

(57) ABSTRACT

Information leaked from smart cards and other tamper resistant cryptographic devices can be statistically analyzed to determine keys or other secret data. A data collection and analysis system is configured with an analog-to-digital converter connected to measure the device's consumption of electrical power, or some other property of the target device, that varies during the device's processing. As the target device performs cryptographic operations, data from the A/D converter are recorded for each cryptographic operation. The stored data are then processed using statistical analysis, yielding the entire key, or partial information about the key that can be used to accelerate a brute force search or other attack.

19 Claims, 2 Drawing Sheets

U.S. PATENT DOCUMENTS

| | | | |
|---|---|---|---|
| 2,632,058 A | 3/1953 | Gray | |
| 2,733,432 A | 1/1956 | Breckman | |
| 3,816,762 A | 6/1974 | Holt Jr. | |
| 4,107,458 A | 8/1978 | Constant | 178/22 |
| 4,139,839 A | 2/1979 | Fletcher et al. | 340/347 DD |
| 4,200,770 A | 4/1980 | Hellman et al. | 178/22 |
| 4,202,051 A | 5/1980 | Davida et al. | |
| 4,203,166 A | 5/1980 | Ehrsam et al. | 375/2 |
| 4,211,919 A | 7/1980 | Ugon | 235/487 |
| 4,214,126 A | 7/1980 | Wipff | 179/1.5 M |
| 4,225,962 A | 9/1980 | Meyr et al. | |
| 4,243,890 A | 1/1981 | Miller et al. | 250/551 |
| 4,268,898 A | 5/1981 | Brown | |
| 4,295,041 A | 10/1981 | Ugon | 234/487 |
| 4,309,569 A | 1/1982 | Merkle | |
| 4,369,332 A | 1/1983 | Campbell, Jr. | |
| 4,405,829 A | 9/1983 | Rivest et al. | 178/22.1 |
| 4,563,546 A | 1/1986 | Glitz | |
| 4,569,052 A | 2/1986 | Cohn et al. | 371/38 |
| 4,570,084 A | 2/1986 | Griffin et al. | |
| 4,605,820 A | 8/1986 | Campbell, Jr. | |
| 4,605,921 A | 8/1986 | Riddle et al. | 340/347 DD |
| 4,622,480 A | 11/1986 | Uchimura et al. | |
| 4,661,658 A | 4/1987 | Matyas | |
| 4,669,117 A | 5/1987 | Van Eck | |
| 4,680,688 A | 7/1987 | Inou et al. | |
| 4,686,392 A | 8/1987 | Lo | |
| 4,759,063 A | 7/1988 | Chaum | 380/30 |
| 4,776,011 A | 10/1988 | Busby | |
| 4,799,258 A | 1/1989 | Davies | 380/21 |
| 4,813,024 A | 3/1989 | Lisimaque et al. | |
| 4,905,176 A | 2/1990 | Schulz | 364/717 |
| 4,908,038 A | 3/1990 | Matsumura et al. | 902/5 |
| 4,916,333 A | 4/1990 | Kowalski | 307/286.5 |
| 4,932,053 A | 6/1990 | Fruhauf et al. | 380/4 |
| 4,932,057 A | 6/1990 | Kolbert | |
| 4,937,649 A | 6/1990 | Shiba et al. | |
| 4,937,866 A | 6/1990 | Crowther et al. | |
| 5,017,766 A | 5/1991 | Tamada et al. | |
| 5,068,894 A | 11/1991 | Hoppe | |
| 5,086,467 A | 2/1992 | Malek | |
| 5,136,643 A | 8/1992 | Fischer | |
| 5,136,646 A | 8/1992 | Haber et al. | 380/49 |
| 5,144,667 A | 9/1992 | Pogue et al. | 380/45 |
| 5,149,992 A | 9/1992 | Allstot et al. | |
| 5,157,725 A | 10/1992 | Lindholm | |
| 5,159,632 A | 10/1992 | Crandall | 380/28 |
| 5,165,098 A | 11/1992 | Hoivik | |
| 5,177,430 A | 1/1993 | Mohel | |
| 5,181,243 A | 1/1993 | Saltwick et al. | |
| 5,216,713 A | 6/1993 | Lindholm | |
| 5,241,598 A | 8/1993 | Raith | 380/21 |
| 5,243,648 A | 9/1993 | Gilardi et al. | |
| 5,249,294 A | 9/1993 | Griffin, III et al. | |
| 5,293,029 A | 3/1994 | Iijima | |
| 5,297,201 A | 3/1994 | Dunlavy | 380/6 |
| 5,297,207 A | 3/1994 | Degele | 380/46 |
| 5,341,423 A | 8/1994 | Nossen | 380/6 |
| 5,355,413 A | 10/1994 | Ohno | |
| 5,369,706 A | 11/1994 | Latka | 380/23 |
| 5,399,996 A | 3/1995 | Yates et al. | |
| 5,401,950 A | 3/1995 | Yoshida | 235/487 |
| 5,402,402 A | 3/1995 | Kagami et al. | |
| 5,404,402 A | 4/1995 | Sprunk | 380/4 |
| 5,412,379 A | 5/1995 | Waraksa et al. | 340/825.72 |
| 5,412,723 A | 5/1995 | Canetti et al. | 380/21 |
| 5,412,730 A | 5/1995 | Jones | |
| 5,414,614 A | 5/1995 | Fette et al. | |
| 5,420,925 A | 5/1995 | Michaels | 380/23 |
| 5,428,684 A | 6/1995 | Akiyama et al. | |
| 5,434,919 A | 7/1995 | Chaum | |
| 5,444,288 A | 8/1995 | Jacobs | |
| 5,477,039 A | 12/1995 | Lisimaque et al. | |
| 5,481,555 A | 1/1996 | Wade et al. | |
| 5,483,182 A | 1/1996 | Rybicki | |
| 5,483,598 A | 1/1996 | Kaufman et al. | |
| 5,495,098 A | 2/1996 | Pailles et al. | |
| 5,506,905 A | 4/1996 | Markowski et al. | 380/25 |
| 5,511,123 A | 4/1996 | Adams | 380/29 |
| 5,514,982 A | 5/1996 | Hall et al. | |
| 5,515,438 A * | 5/1996 | Bennett et al. | 380/278 |
| 5,539,825 A | 7/1996 | Akiyama et al. | |
| 5,539,827 A | 7/1996 | Liu | 380/37 |
| 5,544,086 A | 8/1996 | Davis et al. | 364/408 |
| 5,546,463 A | 8/1996 | Caputo et al. | 380/25 |
| 5,551,013 A | 8/1996 | Beausoleil et al. | 395/500 |
| 5,552,776 A | 9/1996 | Wade et al. | 340/825.31 |
| 5,557,346 A | 9/1996 | Lipner et al. | |
| 5,559,887 A | 9/1996 | Davis et al. | 380/24 |
| 5,559,890 A | 9/1996 | Obermeire et al. | 380/48 |
| 5,572,112 A | 11/1996 | Saeki et al. | |
| 5,600,273 A | 2/1997 | Hall et al. | |
| 5,600,324 A | 2/1997 | Reed et al. | 341/176 |
| 5,602,917 A | 2/1997 | Mueller | |
| 5,608,614 A | 3/1997 | Ohnishi et al. | |
| 5,623,548 A | 4/1997 | Akiyama et al. | |
| 5,625,692 A | 4/1997 | Herzberg et al. | |
| 5,625,695 A | 4/1997 | M'Raihi et al. | |
| 5,631,492 A | 5/1997 | Ramus et al. | |
| 5,633,930 A | 5/1997 | Davis et al. | 380/24 |
| 5,636,157 A | 6/1997 | Hesson et al. | 364/788 |
| 5,638,444 A | 6/1997 | Chou et al. | |
| 5,663,896 A | 9/1997 | Aucsmith | 395/187.01 |
| 5,664,017 A | 9/1997 | Gressel et al. | 380/30 |
| 5,668,877 A | 9/1997 | Aziz | |
| 5,670,934 A | 9/1997 | Ina et al. | |
| 5,696,827 A | 12/1997 | Brands | |
| 5,703,413 A | 12/1997 | Trehame | |
| 5,710,834 A | 1/1998 | Rhoads | 382/232 |
| 5,727,062 A | 3/1998 | Ritter | |
| 5,727,063 A | 3/1998 | Aiello et al. | 380/46 |
| 5,733,047 A | 3/1998 | Furuta et al. | 384/43 |
| 5,737,419 A | 4/1998 | Ganesan | |
| 5,745,577 A | 4/1998 | Leech | |
| 5,761,306 A | 6/1998 | Lewis | 347/22 |
| 5,764,766 A | 6/1998 | Spratte | |
| 5,778,065 A | 7/1998 | Hauser et al. | 380/21 |
| 5,778,069 A | 7/1998 | Thomlinson et al. | |
| 5,778,074 A | 7/1998 | Garcken et al. | 380/37 |
| 5,796,836 A | 8/1998 | Markham | 380/28 |
| 5,812,669 A | 9/1998 | Jenkins et al. | 380/25 |
| 5,821,775 A | 10/1998 | Mehta et al. | |
| 5,835,599 A | 11/1998 | Buer | 380/29 |
| 5,838,795 A | 11/1998 | Mittenthal | 380/28 |
| 5,848,159 A | 12/1998 | Collins et al. | 380/30 |
| 5,859,548 A | 1/1999 | Kong | |
| 5,870,478 A | 2/1999 | Kawamura | |
| 5,892,829 A | 4/1999 | Aiello et al. | 380/25 |
| 5,905,399 A | 5/1999 | Bosnyak et al. | |
| 5,907,832 A | 5/1999 | Pieterse et al. | |
| 5,914,471 A | 6/1999 | Van De Pavert | |
| 5,917,168 A | 6/1999 | Nakamura et al. | |
| 5,917,754 A | 6/1999 | Pathak et al. | |
| 5,944,833 A | 8/1999 | Ugon | 713/400 |
| 5,946,397 A | 8/1999 | M'Raihi et al. | |
| 5,982,900 A | 11/1999 | Ebihara et al. | 380/30 |
| 5,991,415 A | 11/1999 | Shamir | 380/30 |
| 5,994,917 A | 11/1999 | Wuidart | |
| 5,995,624 A | 11/1999 | Fielder et al. | |
| 5,995,629 A | 11/1999 | Reiner | 380/50 |
| 5,998,978 A | 12/1999 | Connell et al. | |
| 6,018,717 A | 1/2000 | Lee et al. | |
| 6,028,454 A | 2/2000 | Elmasry et al. | |
| 6,031,912 A | 2/2000 | Moulart et al. | |

| | | | |
|---|---|---|---|
| 6,041,122 A | 3/2000 | Graunke et al. ............... 380/21 |
| 6,041,412 A | 3/2000 | Timson et al. ............. 713/200 |
| 6,046,608 A | 4/2000 | Theogarajan |
| 6,047,068 A * | 4/2000 | Rhelimi et al. ................ 380/46 |
| 6,049,613 A | 4/2000 | Jakobsson .................... 380/47 |
| 6,064,724 A | 5/2000 | Kelly ...................... 379/92.04 |
| 6,064,740 A | 5/2000 | Curiger et al. ............. 380/265 |
| 6,066,965 A | 5/2000 | Blomgren et al. |
| 6,069,497 A | 5/2000 | Blomgren et al. |
| 6,069,954 A | 5/2000 | Moreau ....................... 380/28 |
| 6,070,795 A | 6/2000 | Feiken |
| 6,078,663 A | 6/2000 | Yamamoto |
| 6,090,153 A | 7/2000 | Chen et al. |
| 6,107,835 A | 8/2000 | Blomgren et al. |
| 6,115,601 A | 9/2000 | Ferreira |
| 6,128,391 A | 10/2000 | Denno et al. |
| 6,181,596 B1 | 1/2001 | Horne et al. |
| 6,185,596 B1 | 2/2001 | Hadad et al. |
| 6,211,456 B1 | 4/2001 | Seningen et al. |
| 6,236,981 B1 | 5/2001 | Hill |
| 6,247,129 B1 | 6/2001 | Keathley et al. |
| 6,278,783 B1 | 8/2001 | Kocher et al. |
| 6,289,455 B1 | 9/2001 | Kocher et al. |
| 6,298,442 B1 | 10/2001 | Kocher et al. |
| 6,304,658 B1 | 10/2001 | Kocher et al. |
| 6,327,661 B1 | 12/2001 | Kocher et al. |
| 6,336,188 B2 | 1/2002 | Blake-Wilson et al. |
| 6,345,359 B1 | 2/2002 | Bianco |
| 6,381,699 B2 | 4/2002 | Kocher et al. |
| 6,393,567 B1 | 5/2002 | Colnot |
| 6,434,238 B1 | 8/2002 | Chaum et al. ................ 380/45 |
| 6,442,525 B1 | 8/2002 | Silverbrook et al. |
| 6,510,518 B1 | 1/2003 | Kocher et al. |
| 6,539,092 B1 | 3/2003 | Kocher et al. |
| 6,698,662 B1 | 3/2004 | Feyt et al. ................... 235/492 |
| 6,748,410 B1 * | 6/2004 | Gressel et al. ............. 708/491 |
| 7,073,072 B1 * | 7/2006 | Salle .......................... 713/193 |
| 6,654,884 B2 | 11/2006 | Kocher et al. |
| 2001/0016908 A1 | 8/2001 | Blake-Wilson et al. |
| 2001/0053220 A1 | 12/2001 | Kocher et al. |
| 2002/0118190 A1 | 8/2002 | Greasley |
| 2003/0028771 A1 | 2/2003 | Kocher et al. |
| 2003/0188158 A1 | 10/2003 | Kocher et al. |
| 2006/0045264 A1 | 3/2006 | Kocher et al. |
| 2008/0022146 A1 | 1/2008 | Kocher et al. |
| 2008/0059826 A1 | 3/2008 | Kocher et al. |

FOREIGN PATENT DOCUMENTS

| | | |
|---|---|---|
| EP | 0 240 328 A2 | 10/1987 |
| EP | 90201136.0 | 11/1990 |
| EP | 0 452 031 A2 | 10/1991 |
| EP | 0 529 261 A2 | 3/1993 |
| EP | 0 563 912 A1 | 10/1993 |
| EP | 0 424 415 B1 | 2/1994 |
| EP | 0 582 395 A2 | 2/1994 |
| EP | 0 656 708 A1 | 6/1995 |
| EP | 0 660 562 A2 | 6/1995 |
| EP | 0 790 547 A1 | 8/1997 |
| EP | 0826169 B1 | 9/1997 |
| EP | 1064752 B1 | 9/1999 |
| EP | 1204948 B1 | 2/2001 |
| FR | 2738970 A1 * | 3/1997 |
| FR | 2738971 A1 * | 3/1997 |
| JP | 60-146361 | 8/1985 |
| JP | 62-082702 | 4/1987 |
| JP | 62-166489 | 7/1987 |
| JP | 62-260406 | 11/1987 |
| JP | 64-081087 | 3/1989 |
| JP | 02-187888 | 7/1990 |
| JP | 05-094458 | 4/1993 |
| JP | 09-163469 | 6/1997 |
| JP | 10-084223 | 3/1998 |
| JP | 10-171717 | 6/1998 |
| JP | 10-197610 | 7/1998 |
| WO | WO 97/13342 | 4/1997 |
| WO | WO 97/14085 | 4/1997 |
| WO | WO 97/14086 | 4/1997 |
| WO | WO 97/33217 A1 | 9/1997 |
| WO | WO 98/52319 | 11/1998 |
| WO | WO99/08411 A2 | 2/1999 |
| WO | WO 99/49416 A1 | 9/1999 |
| WO | WO 99/63419 A1 | 12/1999 |

OTHER PUBLICATIONS

Bell, Jim, "Spread-Spectrum Computer Clock?" Google Beta Groups.

Bellare et al., "Optimal Asymmetric Encryption", Advanced Networking Laboratories, 1998, pp. 92-111, Springer-Verlag, U.S.A.

Bellare et al, "The Exact Security of Digital Signatures- How to Sign with RSA and Rabin", Advances in Cryptology—Eurocrypt 96 Proceedings, Lecture Notes in Computer Science, vol. 1070, pp. 1-16, U. Maurer ed., Springer-Verlag, 1996.

Bellare et al, "Forward Integrity For Secure Audit Logs", pp. 1-16, Nov. 23, 1997, U.S.A.

Frankel et al., "Optimal-Resilience Proactive Public-Key Cryptosystems", IEEE Symposium on Foundations of Computer Science, 1997.

Frankel et al., "Proactive RSA", Lecture Notes in Computer Science, 1996.

Herzberg et al, "Proactive Public Key and Signature Systems", ACM Conference on Computer and Communications Security, 1996.

Menzes et al, "Pseudorandom Bits and Sequences", Handbook of Applied Cryptography, CRC Press, Chapter 5, pp. 169-190, 1996.

Menzes et al, "Efficient Implementation", Handbook of Applied Cryptography, CRC Press, Chapter 14, pp. 591-634, 1996.

Rivest, Ronald, "Timing Cryptanalysis of RSA, DH, DDS" Google Beta Groups.

Kocher, P., "Timing Attacks on Implementations of Diffie-Hellman, RSA, DSS, and Other Systems", Aug. 18, 1996 XP000626590.

Lacy, J. et al., "CryptoLib Version 1.1", File Bigpow.c from CryptoLib, United States, Nov. 1999.

"File NN.C from RSAFEF", RSA Laboratories, a division of RSA Data Security, Inc., United States, 1991.

Wayner, P., "Code Breaker Crack Smart Cards, Digital Safe", New York Times, United States, Jun. 22, 1998, on the World Wide Web at: http://www.nytimes.com/library/tech/98/06/biztech/articles/22card.html.

American National Standards for Financial Services, secretariat—American Bankers Association (ANS/ABA x9.24-1997), "Financial Services Key Management," approved Apr. 6, 1992, American National Standards Institute; pp. 1-71.

Jueneman, Robert R., "Analysis of Certain Aspects of Output Feedback Mode", Satellite Business Systems, 1998; pp. 99-127.

Bauer, Friedrich L., "Cryptology—Methods and Maxims", Technical University Munich, 1998; pp. 31-48.

Connor, Doug (Technical Editor), "Cryptographic Techniques—Secure Your Wireless Designs", Jan. 18, 1996; pp. 57-68.

Hornauer et al., "Markov Ciphers and Alternating Groups," Eurocrypt 91, 1991; pp. 453-460.

Koblitz, "A Course in Number Theory and Cryptography" 2e, 1994, Chapter III; pp. 53-77.

Lai et al., "Markov Ciphers and Differential Cryptanalysis," Eurocrypt 91, 1991; pp. 17-38.

Hachez et al. "Timing Attack: What Can Be Achieved By A Powerful Adversary?" 1999.

Kocher, Paul C., "Cryptanalysis of Diffie-Hellman, RSA, DSS, and Other Systems Using Timing Attacks," Report Dec. 7, 1995; pp. 1-6.

Kaliski, Burt, "Timing Attacks on Cryptosystem," RSA Laboratories, Bulletin, No. 2, Jan. 23, 1996.

"Security Requirements for Cryptographic Modules," Federal Information Processing Standards Publication (FIPS PUB) 140-1, U.S. Department of Commerce, National Institute of Standards and Technology, Jan. 1994, pp. 1-53.

RSA Data Security, RSAREF Cryptographic Toolkit Source Code, File R_RANDOM.C, available from ftp://ftp.rsa.com, created 1991, pp. 1-2.

M. Bellare et al., "Incremental Cryptography: The Case of Hashing and Signing" in: Desmedt, Y., Advances in Cryptography—Crypto 94 Proceedings (Springer-Verlag, 1994) pp. 216-233.

Paul C. Kocher, "Timing Attacks on Implementation of Diffie-Hellman, RSA, DSS, and Other Systems," in: Koblitz, N., Advances in Cryptology—Crypto '96 (Berlin, Springer, 1996), pp. 104-113.

Schneier, Bruce, Applied Cryptography, Second Edition: Protocols, Algorithms, and Source Code in C, John Wiley & Sons, Inc. Oct. 18, 1995, pp. 34-41, 390-392 and 480-481.

Krawczyk, H., et al., "HMAC: Keyed-Hashing for Message Authentication," Network Working Group Request for Comments RFC 2104, Feb. 1997, pp. 1-11.

Ryan J. "Blinds for Thermodynamic Cipher Attacks," unpublished material on the World Wide Web at http://www.cybertrace.com/thrmatak.html, Mar. 1996, pp. 1-7.

"Data Encryption Standard," Federal Information Processing Standards Publication (FIPS PUB) 46-2, U.S. Department of Commerce, National Institute of Standards and Technology, Dec. 30, 1993, pp. 1-21.

Biham, E., et al., "Differential Fault Analysis of Secret Key Cryptosystems," in: Kaliski, B., Advances in Cryptology-CRYPTO '97 (Berlin, Springer, 1997), 17th Annual International Cryptology Conference, Aug. 17-21, 1997, pp. 513-525.

Based on "Karn/Hoey/Outerbridge" implementation (KHODES): "File DESC.C from RSAREF—Data Encryption Standard routines for RSAREF."

Alfred J. Menezes et al., "Handbook of Applied Cryptography" (CRC Press, 1996), pages including 285-298, 312-319, 452-462, 475, 515-524.

Bank Technology News. Cries of Wolf Over Smart Card Security? Faulkner & Gray, Inc. Nov. 1, 1996.

Posting on sci.crypt newsgroup, Rivest, Ron, "Announce: Timing cryptanalysis of RSA, DH, DSS", Dec. 11, 1995, retrieved from internet Nov. 19, 2005, http://groups.google,com/group/sci.crypt/msg/79e75dc930adf?dmode=source&hl=en.

Posting on sci.crypt newsgroup, Kocher, Paul C, "Announce: Timing cryptanalysis of RSA, DH, DSS", Dec. 11, 1995, retrieved from internet Nov. 19, 2005, http://groups.google,com/group/sci.crypt/msg/027dadba758893a5?dmode=source&hl=en.

Posting on sci.crypt newsgroup, Walters, Jim, "Announce: Timing cryptanalysis of RSA, DH, DSS", Dec. 11, 1995, retrieved from internet Nov. 19, 2005, http://groups.google,com/group/sci.crypt/msg/77b761989c18baea?dmode=source&hl=en.

Posting on sci.crypt newsgroup, Kocher, Paul C, "Announce: Timing cryptanalysis of RSA, DH, DSS", Dec. 12, 1995, retrieved from internet Nov. 22, 2005, http://groups.google,com/group/sci.crypt/msg/769112d9a7a17488?dmode=source&hl=en.

Posting on sci.crypt newsgroup, Rubin, Paul, "Announce: Timing cryptanalysis of RSA, DH, DSS", Dec. 12, 1995, retrieved from internet Nov. 22, 2005, http://groups.google,com/group/sci.crypt/msg/7c8fva520b1b5482?dmode=source&hl=en.

Posting on sci.crypt newsgroup, Brown, Ralf, "Announce: Timing cryptanalysis of RSA, DH, DSS", Dec. 12, 1995, retrieved from internet Nov. 22, 2005, http://groups.google,com.group.sci.crypt/msg/417b42c49fe7cf53?dmode=source&hl=en.

Posting on sci.crypt newsgroup, Stewart, Bill, "Announce: Timing cryptanalysis of RSA, DH, DSS", Dec. 13, 1995, retrieved from internet Nov. 22, 2005, http://groups.google,com/group/sci.crypt/msg/7610aea60249ed48?dmode=source&hl=en.

Posting on sci.crypt newsgroup, Larry, "Announce: Timing cryptanalysis of RSA, DH, DSS", Dec. 15, 1995, retrieved from internet Nov. 22, 2005, http:groups.google,com/group/sci.crypt/msg/ced8289a35a32925?dmode=source&hl=en.

Posting on sci.crypt newsgroup, Costa, Bob, "Re: Attacking machines on the Internet (re: Timing cryptanalysis of RSA, DH, DSS)", Dec. 16, 1995, retrieved from internet Nov. 22, 2005, http://groups.google,com/group/sci.crypt/msg/350820497cce62ba?dmode=source&hl=en.

Posting on sci.crypt newsgroup, Perry, Tom "Announce: Timing cryptanalysis of RSA, DH, DSS", Dec. 17, 1995, retrieved from internet Nov. 22, 2005, http://groups.google,com/group/sci.crypt/msg/20e43912653f9bd0?dmode=source&hl=en.

Posting on sci.crypt newsgroup, Bell, Jim, "Spread-Spectrum computer clock?", Dec. 24, 1995, retrieved from internet Nov. 22, 2005, http://groups.google,com/group/sci.crypt/msg/485abca33cc29703?dmode=source&hl=en.

Posting on mail.cypherpunks, Brandt, Eli, "Re: Timing Attacks", Dec. 11, 1995, retrieved from internet Dec. 7, 2005, http://groups.google.com/group/mail.cypherpunks/msg/fa276adeb23f2b83?dmode=source.

Posting on mail.cypherpunks, Armadillo Remailer, "Re: Timing Attacks", Dec. 13, 1995, retrieved from internet Nov. 22, 2005, http://groups.google.com/group/mail.cypherpunks/msg/fedb10d2bcf3ff6f?dmod...

Posting on mail.cypherpunks, Hoselton, Rick, "Re: Timing Cryptanalysis Attack", Dec.14, 1995, retrieved from internet Nov. 22, 2005, http://groups.google.com/group/mail.cypherpunks/msg/470f2482c69f3212?dmo...

Declaration of Paul Kocher concerning the 1995 postings, Kocher, Paul, Dec. 16, 2005.

"Patent Abstracts of Japan", JP 02-187888, downloaded Jan. 10, 2007.

"Patent Abstracts of Japan", JP 05-094458, downloaded Jan. 10, 2007.

"Patent Abstracts of Japan", JP 10-171717, downloaded Jan. 10, 2007.

"Patent Abstracts of Japan", JP 60-146361, downloaded Jan. 10, 2007.

"Patent Abstracts of Japan", JP 62-166489, downloaded Jan. 10, 2007.

"Patent Abstracts of Japan", JP 64-081087, downloaded Jan. 10, 2007.

*Cryptography Research Inc.* v. *VISA International Service Association*, VISA International Service Association's Answer to Second Amended Complaint and Counterclaims, United States District Court Case No. C 04- 04143 JW (HRL), Northern District of California, San Jose Division, Apr. 23, 2007.

*Cryptography Research Inc.* v. *VISA International Service Association*, Defendant Visa International Service Association's Final Invalidity Contentions for U.S. Patent No. 6,327,661 Pursuant to Patent L.R. 3-6(B), United States District Court Case No. 5:04-CV--04143-JW (HRL), Northern District of California, San Jose Division, Dec. 8, 2006.

Anderson, Ross et al., "Tamper Resistance - a Cautionary Note", *The Second Usenix Workshop on Electronic Commerce Proceedings*, Nov. 18-21, 1996, Oakland, CA.

Chaum and Price (Eds.), "IC Cards in High-Security Applications", *Advances in Cryptology - Eurocrypt '87*, LNCS 304, Amsterdam, NE (1988), pp. 177-199.

"Announce: Timing Cryptanalysis of RSA, DH, DSS", sci.crypt newsgroup postings, Dec. 13-15, 1995.

"Digital Signature Standard (DSS)", Federal Information Processing Standards Publication 186, May 19, 1994, downloaded: Jan. 22, 2007, website: http://www.itl.nist.gov/fipspubs/flp186.htm.

"Eurocrypt '97 Rump Session Program", May 13, 1997, Konstanz, Germany, downloaded: Jan. 29, 2007, website: http://www.iacr.org/conferences/ec97/rump.html.

"Kocher Algorithm", sci.crypt newsgroup postings, Google Groupes, Mar. 12, 1996, http://groups.google.fr/group/sci.crypt/browse_thread/thread/240f02445602362e/644d5300cdbbf7e3?lnk=gst&q=%q=%22Kocher+Algorithm%22&mum=1&ht=fr#644d5300cdbbf7e3.

"Public-Key-Algorithm for Digital Signature", National Institute of Standards and Technology, Aug. 1991, pp. 553-564 (German translation).

Anderson et al., "Robustness Principles for Public Key Protocals", LNCS 963, Proc. Crypto '95, 1995, pp. 236-247.

Anderson, Ross, "Two Remarks on Public Key Cryptology", Computer Laboratory, University of Cambridge, Technical Reporti, No. 549, Dec. 2002, ISSN 1476-2986.

Beker et al., "Key Management for Secure Electronic Funds Transfer in a Retail Environment", Proc. Crypto '84, Springer-Verlag, 1998, pp. 401-410.

Boneh et al., "On the Importance of Eliminating Errors in Cryptographic Computations", Journal of Cryptology, 2001, vol. 14, No. 2, pp. 101-119.

Bovelander, Ernst, "Smart Card Security 'How Can We Be So Sure?", COSIC '97 Course, Incs 1528, Springer-Verlag, 1998, pp. 333-337.

Burmester et al., "A Secure and Efficient Conference Key Distribution Syetem", LNCS 1189, Proc. International Workshop on Security Protocols, 1996, Springer-Verlag, 1998, pp. 275-286.

Daemen, Joan, "Management of Secret Keys: Dynamic Key Handling", LNCS 1528, Proc. COSIC '97 Course, Springer-Verlag, 1998, pp. 264-276.

Frankel et al., "Proactive RSA", Sandia Report SAND96-0856, Apr. 15, 1996.

Gennaro et al., "Robust Threshold DSS Signatures", LNCS 1070, Proc. Eurocrypt '96, Springer-Verlag, 1998, pp. 354-371.

Gillogly et al., "Notes on Crypto '95 Invited Talks by R. Morris and A. Shamir", Cipher 9, Sep. 18, 1995, http://www.leee-security.org/cipher/confreports/conf-rep-Crypto95.html.

Herzberg et al., "Proactive Secret Sharing Or: How to Cope with Perpetual Leakage", LNCS 963, Proc. Crypto '95, Springer-Verlag, 1998, pp. 339-352.

Jablon, David P., "Strong Password-Only Authenticated Key Exchange", Computer Communication Review, Sep. 25, 1996, vol. 26, No. 5, pp. 5-26.

Kocher, P., Message: "Re: Timing cryptanalysis of RSA, DH, DSS (Tomazic, RISKS 17.59", The Risks Digest, Forum on Risks to the Public in Computers and Related Systems, vol. 17: Issue 60, Jan. 3, 1996, downloaded: Jan. 23, 2007, website: http://catless.ncl.ac.uk/Risks/17.60.html.

Matsumoto at al., "Speeding Up Secret Computations with Insecure Auxiliary Devices", LNCS 403, Proc. Crypto '88, Springer-Verlag, 1998, pp. 499-506.

Naccache et al., "Can D.S.A. be Improved?" -Complexity Trade-Offs with the Digital Signature Standard-', LNCS 950, Proc. Eurocrypt '94, 1995, Springer-Verlag, 1998, pp. 77-85.

Naccache, David, "Can O.S.S. be Repaired?" - Proposal for a New Practial Signature Scheme-, LNCS 765, Proc. Eurocrypt '93, 1994, Springer-Verlag, 1998, pp. 233-239.

Naccache, David, "To Whom it May Concern", Forensic Expert Witness by the Court of Appeal, Paris, Dec. 6, 2006.

Ouisquater at al., "Fast Decipherment Algorithm for RSA Public-Key Crypptosystem", Aug. 27, 1982, Electronics Letters 14th Oct. 1982, vol. 18, No. 21, pp. 905-907.

Rankl et al., "Smart Card Handbook", John Wiley & Sons Ltd., 1997, pp. 66-83, 182-189, 208-217, and 237-272.

Robshaw et al., "Overview of Elliptic Curve Cryptosystems", RSA Laboratories Technical Note, revised Jun. 27, 1997, downloaded: Jan. 23, 2007, website: http://www.rsasecurity.com/resalabs/node.asp?id=2013.

Schneier, Bruce, "Applied Cryptography", 2nd Edition, John Wiley & Sons, Inc., 1996, pp. 525-573 (German translation).

Schnorr, C.P., "Efficient Signature Generation by Smart Cards", Journal of Cryptology, 1991, pp. 161-174.

Shamir, Adi, "On the Poser of Commutativity in Cryptography", LNCS 85, Proc. 7th Colloquia on Automata, Languages and Programming, 1980, pp. 582-595.

Steiner et al., "Diffie-Hellman Key Distribution Extended to Group Communication", Third ACM Conf. Computer and Comm. Security, Mar. 1996, pp. 31-37.

Yen et al., "RSA Speedup with Chinese Remainder Theorem Immune against Hardware Fault Cryptanalysis", IEEE Transactions on Computers, Apr. 2003, vol. 52, No. 4., pp. 481-472.

Hevia, Alejandro et al., "Strength of Two Data Encryption Standard Implementations under Timing Attacks", Lecture Notes in Computer Science 1380 - LATIN '98: Theoretical Informatics 3rd latin American Symposium, Campinas, Brazil, Apr. 1998; pp. 192-205.

Kocher, Paul, "Differential Power Analysis", The Risks Digest, vol. 19(80), ACM Committee on Computers and Public Policy, New York, Jun. 10, 1998. http://catless.ncl.ac.uk/Risks/19.80.html.

Goutay, J., "Smart Card Applications in Security and Data Protection", *Advances in Cryptology - Eurocrypt '84*; LNCS 209, Springer-Verlag, Berlin, Germany; (1985) pp. 459-463.

Guillou, L.C. et al:, "Smart Card, a Highly Reliable and Portable Security Device", *Advances in Cryptology - Crypto '86*; LNCS 263, Springer-Verlag, Berlin, Germany; (1987) pp. 464-479.

Guillou, L.C., "Smart Cards and Conditional Access", *Advances in Cryptology - Eurocrypt '84*; LNCS 209, Springer-Verlag, Berlin, Germany; (1985) pp. 480-489.

Guthery, Scott, "Smart Cards", www.usenix.org/publications/login/1989-5/guthery.html; May, 1989.

Highland, Harold Joseph, "The Tempest over Leaking Computers", *Abacus*, vol. 5(2), Winter 1988, pp. 10-18, 53. http://cryptome.org/tempest-leak.htm.

ISO/IEC 7816 *International Standard*, Geneva, CH: Part 1 Physical Characteristics (Ref. No. IISO/IEC 7816-1:1998(E)), Part 1 Amendment 1 Physical Characteristics (Ref. No. ISO/IEC 7816-1:1998/AMD.1:2003(E)), and Part 2 Dimensions and location of the contacts (Ref. No. ISO/IEC 7816-2:1999(E)).

Krivachy, T., "The Chipcard - an Identification Card with Cryptographic Protection", *Advances in Cryptology - Eurocrypt '85*; LNCS 219, Springer-Verlag, Berlin, Germany (1986) pp. 200-207.

Kuhn, Markus G. et al., "Soft Tempest: Hidden Data Transmission Using Electromagnetic Emanations", *Information Hiding 1989*, LNCS 1525, pp. 124-142, Portland, Oregon, Apr. 15-17, 1998, found at http://www.cl.cam.ac.uk/~mgk25/h98-tempest.pdf.

Menezes, A.J. et al., *Handbook of Applied Cryptography*, Chapters 1, 5 and 7; CRC Press, Boca Raton; Florida (1997).

Meyer, Carl H. et al., *Cryptography: a New Dimension in Computer Data Security*; Ch. 1; John Wiley & Sons, 1982.

Rankl et al., *Smart Card Handbook*, John Wiley & Sons Ltd., 1997, Chs. 2, 3, 8, 13, and pp. 84-89 (part of Chapter 4), Chichester, West Sussex, England.

Schmidt, Dick, "Visions on Developments in Information Security", TNO Conference, Delft, Netherlands, Oct. 2-3, 1997.

Smulders, Peter, "The Threat of Information Theft by Reception of Electromagnetic Radiation from RS-232 Cables", *Computers and Security*, vol. 9, pp. 53-58, 1990; Elsevier Science Publishers Ltd.

Wakerly, John F., "Introduction to Computers and Programming", Chapter 1, pp. 1-16, *Microcomputer Architecture and Programming: The 68000 Family*, John Wiley & Sons, New York, n.Y. (1989).

Transcript of United States Air Force Audio Visual Presentation, "So You Think You're Secure", Aerospace Audio Visual Service; TF32-4599, 1972; Military Airlift Command; Tf 6502.

U.S. Appl. No. 11/977,392, Paul C. Kocher et al., U.S. Appl. No. 11/977,392, filed Jan. 24, 2007.

U.S. Appl. No. 11/981,495, Paul C. Kocher et al., U.S. Appl. No. 11/981,495, filed Oct. 30, 2007.

U.S. Appl. No. 11/978,364, Paul C. Kocher et al., U.S. Appl. No. 11/978,364, filed Oct. 29, 2007.

Schneier, Bruce, *Applied Cryptography*, Chapter 12, pp. 265-301, John Wiley & Sons, Inc. (2d. Ed. 1996), New York, NY.

Grounds of Opposition, *European Patent 1092297* in the name of Cryptography Research, Inc., Opposition by Visa Europe Services, Inc., Jan. 25, 2008.

Posting on sci.crypt newsgroup, Kocher, Paul C et al., "Announce: Timing cryptanalysis of RSA, DH, DSS" et al., messages 1-51 of 51, Dec. 11, 1995 through Dec. 24, 1995, http://groups.google,com/group/sci.crypt.

Daemen, Joan, "Management of Secret Keys: Dynamic Key Handling", Course on Computer Security and Industrial Cryptography (COSIC '97 - Jun. 1997) Presentation Slides; and declaration of Professor Bart Preneel dated Jun. 15, 2007.

Davies & Price, Security for Computer Networks: An Introduction to Data Security in Teleprocessing and Electronic Funds Transfer, 2nd Ed., John Wiley & Sons, New York, NY, 1989, pp. 318-321.

Piper, F., Key Management (Part 3.5) ZERGO: Information Security Training Club, Hampshire, U.K., Jan. 1993, Foils 6-18 to 6-30.

Piper, F., Declaration of, Jan. 21, 2008, University Of London, England.

Bradley, S., "Derived Unique Key Per Transaction Schemes," Some Applications Of Mathematics to the Theory of Communications, Ch. 4, pp. 132-199, Ph.D. Thesis, University of London, England, 1994.
ISO (International Organization for Standardization), Banking - Key management (retail), "Part 3: Key life cycle for symmetric ciphers", ISO 11568-3 First edition, Dec. 1, 1994, pp. 1-16, www.saiglobal. com/shop.
American National Standard for Financial Services, secretariat - American Bankers Association (ANS/ABA X9.24-200x), Key Management Using Triple DEA and PKI, revised by Terry Benson, American National Standards Institute, Sep. 12, 2000.
Menzes, A.J. et al., Handbook of Applied Cryptography, pp. 71, 586, 636-637, CRC Press, Boca Raton, Florida (1997).
Interbank Card Association, PIN Manual: a Guide to the Use of Personal Identification Numbers in Interchange, pp. 61- 127, 1979.
Sedgewick, Robert, Algorithims, 2nd Ed., Chs. 4 and 11, Addison-Wesley, Arlington, VA, 1988.
Brassard, Gilles, "On computationally secure authentication tags requiring short secret shared keys", *Adv. Of Crypt.*: Proceedings of Crypto-82, D. Chaum, R.L., Rivest, and A.T. Sherman, Eds. Plenum Press, New York, NY, 1982, pp. 79-86. Jul. 17, 2008.
Visa International Service Association's Preliminary Invalidity Contentions, Filed in Case C04-4143 JW in US District Court for N. District of California, San Jose Division, Jun. 2, 2005.
Kuhn and Anderson, "Soft Tempest: Hidden Data Transmission Using Electromagnetic Emanations." Proceedings of the Second International Workshop on Information Hiding, Portland, Oregon, Apr. 1998, pp. 124-142.
Menezes, et al., "CRCHandbook of Applied Cryptography", Boca Raton, Florida: CRC Press LLC, 1996, pp. 591-634.
Visa International Service Association's Final Invalidity Contentions for U.S. Patent No. 6,278,783 Filed in Case C04-4143 JW in US District Court for N. District of California, San Jose Division, Jun. 28, 2007.
Alon, et al., "Efficient Dynamic-Resharing 'Verifiable Secret Sharing' Against Mobile Adversary", Mar. 25, 1995.
Charnes, et al., "Comments on Soviet Encryption Algorithm", Springer-Verlag, 1998.
Maurer, Ueli M., "A Provably-Secure Strongly-Randomized Cipher", Springer-Verlag, 1998.
Meijer and Aki, "Digital Signature Schemes", May 1982, Extended summary of paper prsented at CRYPTO 81, Santa Barbara, CA, Aug. 1981.
Shamir, Adi, "How to Share a Secret", Communications of the ACM Nov., 1979, vol. 22, No. 11.
Visa International Service Association'S Final Invalidity Contentions for U.S. Patent No. 6,298,442 Filed in Case C04-4143 JW in US District Court for N. District of California, San Jose Division, Jun. 16, 2007.
Brickell, et al., "Fast Exponentiation with Precomputation (Extended Abstract)", Springer-Verlag, 1998.
De Rooij, Peter, "Efficient Exponentiation using Precomputation and Vector Addition Chains", Springer-Verlag, 1998, possibly a reprint from Advances in Cryptology, Eurocrypt '94, 1994.
Dimitrov, et al., "An Algorithm for Modular Exponentiation", Information Processing Letters, vol. 66, Issue 3, pp. 155-159, May 15, 1998.
Dimitrov, et al., "Two Algorithms for Modular Exponentiation Using Nonstandard Arithmetics", IEICE Trans. Fundamentals, vol. E78-A, No. 1, Jan. 1995.
Gollman, et al., "Redundant Integer Representations and Fast Exponentiation", Designs, Codes and Cryptography, 7, 135-151, Kluwer Academic Publishers, Boston, MA, 1996.
Hong, et al., "New Modular Multiplication Algorithms for Fast Modular Exponentiation", Springer-Verlag, 1998, from Advances in Cryptology, Eurocrypt '96, 1996.
Jedwab and Mitchell, "Minimum Weight Modified Signed-Digit Represenations and Fast Exponentiation", Electronics Letters, v. 25, No. 17, Aug. 17, 1989.
KOç, çEtin K., "High-Radix and Bit Recoding Techniques for Modular Exponentiation", Intern. J. Computer Math, v. 40 pp. 139-156, 1991, Gordon and Breach Science Publishers, S.A. (Uk).

Eğecioğlu and KOç, "Exponentiation using Canonical Recoding," Theoretical Computer Science 129, pp. 407-417, Elsevier, 1994.
KOç, çEtin K., "High-Speed RSA Implementation", RSA Laboratories, Nov. 1994.
Lim and Lee, "More Flexible Exponentiation with Precomputation", Advances in Cryptology, Springer-Verlag, 1998 possibly from Crypto '94, Aug. 1994.
Davies & Price, Security for Computer Networks: an Introduction to Data Security in Teleprocessing and Electronic Funds Transfer, John Wiley & Sons, New York, NY, 2nd Ed., 1989, 377 pages (entire book).
Defendant Visa International Service Association's Final Invalidity Contentions for U.S. Patent No. 6,304,658 Pursuant to Patent L.R. 3-6(b), Feb. 8, 2008, Case No. C04-04143 JW(HRL), U.S. District Court, Northern District of California, San Jose Division.
Defendant Visa International Service Association's Final Invalidity Contentions for U.S. Patent No. 6,381,699 Pursuant to Patent L.R. 3-6(b), Feb. 8, 2008, Case No. C04-04143 JW(HRL), U.S. District Court, Northern District of California, San Jose Division.
Defendant Visa International Service Association's Final Invalidity Contentions for U.S. Patent No. 6,510,518 Pursuant to Patent L.R. 3-6(b), Feb. 8, 2008, Case No. C04-04143 JW(HRL), U.S. District Court, Northern District of California, San Jose Division.
Defendant Visa International Service Association's Final Invalidity Contentions for U.S. Patent no. 6,654,884 Pursuant to Patent L.R. 3-6(b), Feb. 8, 2008, Case No. C04-04143 JW(HRL), U.S. District Court, Northern District of California, San Jose Division.
Anderson, Ross & Biham, Eli, "Tiger: A Fast New Hash Function", Fast Software Encryption, Third International Workshop Proceedings, Springer-Verlag, Berlin, Germany, 1996, pp. 89-97.
Back, Adam, "non-interactive forward secrecy", posting to *Cypherpunks.Venona.com message board*, Sep. 6, 1996. http:// cypherpunks.venona.com/date/1996/09/msg00561.html.
Draper, Don et al., "Circuit Tchniques in a 266-MHz MMX-Enabled Processor", *IEEE J Solid State-Circuits*, pp. 1650-1664, Nov. 1997.
Eberle, Hans & Thacker, Charles P., "A 1 GBIT/Second GAAS DES Chip", *Proceedings of the 1992 IEEE Custom Integrated Circuits Conference*, May 3-6, 1992.
Eichelberger, E.B. & Bello, S.E., "Differential current switch -- High performance at low power", *IBM J. Res. Develop.*, 35(3):313-320, May 1991.
Gonzalez, Jose Luis & Rubio, Antonio, "TCMOS: A Low Noise Power Supply Technique for Digital ICs", Electronics Letters, 31(16):1338-1339, Aug. 3, 1995.
Greub, Hans J. et al., "High-Performance Standard Cell Library and ModelingTechnique for Differential Advanced Bipolar Current Tree Logic", *IEEE Journal. of Solid-State Circuits*, 26(5):749-762, May 1991.
Hough, Charles et al., "New Approaches for On-Chip Power Switching Noise Reduction", *Proceedings of the IEEE 1995 Custom Integrated Circuits Conference*, May 1-4, 1995, pp. 133-136.
Ivey, Peter A. et al, "A Single-Chip Public Key Encryption Subsystem", *IEEE J. Solid-State Circuits*, 24(4):1071-1075, Aug. 1989.
Jablon, David P., "Strong Password-Only Authenticated Key Exchange", *Computer Communication Review*, ACM SIGCOMM, Univ. of MA., pp. 5-26, Sep. 25, 1996.
Jarecki, Stanislaw, "Proactive Secret Sharing and Public Key Cryptosystems", thesis, Massachusetts Institute of Technology, Sep. 1995, Cambridge, MA.
Karlsson, Magnus et al., "Implementation of bit-serial adders using robust differential logic," *Proc. IEEE Nordic Event in Asic Design Conf.*, Norchip'97, Tallin, Estonia, Nov 10-11, 1997.
Larsson, Patrik, "di/dt Noise in CMOS Integrated Circuits", *Analog Integrated Curcuits and Signal Processing*, 14:113-129, Kluwer Academic Publishers, Boston, MA, 1997.
Lin, Mao-Chao, "Constant Weight Codes for Correcting Symmetric Errors and Detecting Unidirectional Errors", *IEEE Transactions on Computers*, 42(11): 1294-1302, Nov. 1993.
Loy, James R., "Managing Differential Signal Displacement", thesis, Rensselaer Polytechnic Institute, Troy, New York, Aug. 1993.

Maier, Cliff A. et al., "A 533-MHz BiCMOS Superscalar RISC Microprocessor", *IEEE Journal of Solid-State Circuits*, 32(11):1625-1634, Nov. 1997.

Maier, Cliff, "High Speed Microprocessor Cache Memory Hierarchies for Yield-Limited Technologies", dissertation, Rensselaer Polytechnic Institute, Troy, New York, Aug. 1996.

Makie-Fukuda, Keiko et al., "Substrate Noise Reduction using Active Guard Band Filters in Mixed-Signal Integrated Circuits", *1995 Symposium on VLSI Circuits, Digest of Technical Papers*, pp. 33-34, Jun. 8-10, 1995.

Maleki, M. & Kiaei, S., "Enhancement Source-Coupled Logic for Mixed-Mode VLSI Circuits", *IEEE Transactions on Circuits an Systems-II: Analog and Digital Signal Processing*, 39(6):399-402, Jun. 1992.

Oklobdzija, Vojin G., "Differential and Pass-Transistor CMOS Logic for High-Performance Systems", *Proc. $21^{st}$ International Conference on Microelectronics* (MIEL'97), 2:803-810, Nis, Yugoslavia, Sep. 14-17, 1997.

Schettler, Helmut et al., "A CMOS Mainframe Processor with 0.5-µm Channel Length", *IEEE Journal of Solid-State Circuits*, 25(5):1166-1177, Oct. 1990.

Schindler, Volker, "High Speed RSA Hardware Based on Low-Power Pipelined Logic", Dissertation, Institut fur Angewandte Informationsverarbeitung und Kommunikationstechnologie, Graz University of Technology, Graz, Austria, Jan. 1997.

Tabor, Jeff F., "Noise Reduction Using Low Weight and Constant Weight Coding Techniques", dissertation, Massachusetts Institute of Technology, May 11, 1990, Cambridge Massachusetts.

Takashima, Daisaburo et al, "Noise Suppression Scheme for Gigabit-Scale andGigabyte/s Data-Rate LSI", *IEEE Journal of Solid-State Circuits*, 33(2):260-267, Feb. 1998.

Tallini, Luca G. & Bose, Bella, "Design of Balanced and Constant Weight Codes for VLSI Systems", *IEEE Transactions on Computers*, 47(5):556-572, May 1998.

Texas Instruments, SN54LS138, SN54S138, SN74LS138, SN74S138A 3-Line to 8-Line Decoders/Demultiplexers, Texas Instruments, Dallas, Texas, revised Mar. 1988.

Wang, L.K. & Chen, Howard H., "On-Chip Decoupling Capacitor Design to Reduce Switching-Noise-Induced Instability in CMOS/SOI VLSI", *Proceedings1995 IEEE International SOI Conference*, pp. 100-101, Oct. 1995.

Williams, Ted E. & Horowitz, Mark, "Bipolar Circuit Elements Providing Self-Completion-Indication", *IEEE Journal of Solid-State Circuits*, 25(1):309-312,Feb. 1990.

Defendant Visa International Service Association'S Final Invalidity Contentions for U.S. Patent 6,539,092, Filed in Case C04-4143 JW on Nov. 21, 2007, in US District Court for N. District of California, San Jose Division, including exhibits A through C17.

Beker, H.J. et al., "Simplifying Key Management in Electronic Fund Transfer Point of Sale Systems", *Electronics Letters*, I9(20):442-444, Jun. 9, 1983.

Blum, L. et al., "A Simple Unpredictable Pseudo-Random Number Generator", *Siam J. Comput.*, 13(2):364-383, May 1986.

Daemen, Joan, "Management of Secret Keys: Dynamic Key Handling", *COSIC '97 Course, LNCS 1528*, Springer-Verlag, Berlin Heidelberg, Germany, 1998, pp. 262-276.

Daemen, Joan et al., "The Block Cipher Square", *Fast Software Encryption '97, LNCS*, 1267, Springer-Verlag, Berlin Heidelberg, Germany, 1997, pp. 1 - 19.

ISO (International Orgainization for Standardization), "Banking - Key management (retail) - Part 2: Key management techniques for symmetric ciphers", ISO 11568-2 First edition Dec. 1, 1994, pp. 1-16, www.saiglobal.com/shop.

Naccache, David, *Declaration of Professor David Naccache*, with regards to his attendance during Adi Shamir's talk titled "How to Check Modular Exponentiation" at the rump session of Eurocrypt 1997, held on May 13, 1997, Paris, France; date of reference: Dec. 6, 2006.

Notice & Grounds of Opposition of Visa Europe Services, Inc. Against European Patent 1 050 133, vol. 1, Feb. 2, 2007.

Notice of Opposition to European Patent of lnfineon Technologies, AG,. Against European Patent 1 050 133, Feb. 3, 2007 (in the German language).

Notice of Opposition to European Patent of NXP B.V. Against European Patent 1 050 133, Feb. 5, 2007.

Notice & Grounds of Opposition of Visa Europe Services, Inc. Against European Patent 1 050 133, vol. 2, Feb. 1, 2007.

Letter from Infineon Technologies, AG to the European Patent Office calling for the revocation of European Patent 1 050 133, Feb. 3, 2007 (in the English language).

Notice of Opposition to European Patent of NXP B.V. Against European Patent 1 088 295, May 15, 2008.

Letter from NXP B.V. To the European Patent Office concerning the Oral Proceedings in 1 050 133, Oct. 2, 2008.

Stewart, Bill, Declaration of Bill Stewart regarding his newsgroup posting on Dec. 13, 1995, signed in Mountain View CA, on Oct. 2, 2008.

Stewart, Bill et al., "Announce: Timing cryptanalysis of RSA, DH, DSS", posting on Google Groups sci.crypt, Dec. 13,1995, http://groups.google.de/group/sci.crypt/ browse.

Stewart, Bill, "Potential defense against timing attack on Diffie-Hellman", posting on Cypherpunks, Dec. 12, 1995, http://diswww.mit.edu/menelaus/cpunks/45312.

Meyer, Carl H. et al., *Cryptography: A New Dimension in Computer Data Security*, pp. 100-105, 457-464, and 486, John Wiley & Sons, 1982; New York, NY.

Kocher, Paul, "Protection Against DPA and Related Attacks", *Electronics World*, pp. 32-36, Mar. 2008; United Kingdom.

Black, Coral Elizabeth, "Witness Statement of Coral Elizabeth Black", Opposition: Cryptography Research Inc.'s European patent 1 050 133 B1, Jun. 26, 2008, setting the public divulgation date of a previously cited reference as Feb. 7, 1995; United Kingdom.

Brief Communication from the European Patent Office dated Aug. 11, 2008, enclosing "Further Submission on the Second Opponent's Opposition" to EP 1 150 133 B1, Aug. 1, 2008, London, England.

Schneier, Bruce, *Applied Cryptography, Second Edition: Protocols, Algorithms, and Source Code in C*, Chapter 16.3, pp. 379-381, John Wiley & Sons, Inc., New York, NY, 1996.

Cryptography Research Inc., letter from Aidan Robson to EPO regarding EP 1050133, Nov. 13, 2008.

Cryptography Research Inc., Observations on Oppositions filed to EP 1050133, Nov. 13, 2007.

Cryptography Research Inc., Oppositions to EP 1050133 of Cryptography Research Inc., Submissions by the Proprietor in response to the Summons to attend Oral Proceedings, Oct. 2, 2008.

EPO Communication regarding Visa Europe Services Opposition to EP 1092297, Mar. 3, 2008, Munich, Germany.

EPO, Communication to the parties concerning termination of opposition proceedings in EP 1092297, Sep. 24, 2008, Munich, Germany.

EPO, Decision of the Technical Board of Appeal 3.4.02 in EP application No. 00935973.8, May 9, 2008.

European Patent Office, "Communication of a notice of opposition" to European patent 1 084 543 by NXP B.V., Oct. 31, 2008, Berlin, Germany.

European Patent Office, Interlocutory decision in Opposition proceedings, EP 1050133, Dec. 1, 2008, Munich, Germany.

European Patent Office, Summons to attend oral proceedings pursuant to Rule 115(1) EPC regarding EP 1050133, including the EPO's preliminary opinion, Jun. 16, 2008, Munich, Germany.

Infineon Technologies AG, letter withdrawing its opposition to EP 1050133, Aug. 14, 2008, Munich, Germany.

Infineon Technologies AG, letter withdrawing its opposition to EP 1088295, Aug. 14, 2008, Munich, Germany.

Intel & Microsoft Corporations, "Advanced Power Management (APM); BIOS Interface Specification", Rev. 1.2, pp. 4, 5, and 8, Feb. 1996, U.S.A.

Naccache, David & M'Raihi, David, "Cryptographic Smart Cards", *IEEE Micro* 16(3):14-24, Jun. 1996, http://www2.computer.org/prtal/web/csdl/doi/10.1109/40.502402.

Nordman, Bruce et al., "User Guide to Power Management for PCs and Monitors", Environmental Energy Technologies Division, Lawrence Berkeley National Laboratory, University of California, pp. 5 and 9-14, Jan. 1997, Berkeley, CA.

NXP B.V., letter withdrawing its opposition to EP 1050133, Nov. 4, 2008, Dusseldorf, Germany.

NXP by., letter withdrawing its opposition to EP 1084543, Nov. 4, 2008, Dusseldorf, Germany.

Visa Europe Services, application for re-establishment of rights pursuant to Article 122 EPC in EP 1092297, Mar. 20, 2008, London, U.K.

Visa Europe Services, Inc. letter withdrawing its opposition to EP 1050133, Sep. 9, 2008, London, UK.

Visa Europe Services, letter from opponents informing EPO of withdrawal of opposition to EP 1092297, Sep. 9, 2008, London, U.K.

Cryptography Research, Inc., observations on oppositions to EP 99949533.6, Feb. 18, 2009, London, UK.

Perry, Thomas J., "Assignment of Rights", between NXP and Thomas J. Perry with exhibit 'A of communications including the participation of Thomas J. Perry, Feb. 3, 2007, Phoenix, AZ.

Stewart, Bill, "Assignment of Rights", between NXP and Bill Stewart with exhibit A of communications including the participation of Bill Stewart, Dec. 12, 2006, Santa Clara, CA.

* cited by examiner

DIFFERENTIAL POWER ANALYSIS METHOD AND APPARATUS

CROSS-REFERENCE TO RELATED APPLICATIONS

This application is a continuation-in-part of U.S. non-provisional patent application Ser. No. 09/326,222, filed on Jun. 3, 1999, now U.S. Pat. Ser. No. 6,327,661 (which claims the benefit of U.S. provisional patent application Ser. No. 60/087,880, filed on Jun. 3, 1998); this application is also a continuation-in-part of U.S. non-provisional patent application Ser. No. 09/930,836, filed on Aug. 15, 2001 (which is a continuation of U.S. non-provisional patent application Ser. No. 09/324,798, filed on Jun. 3, 1999, now U.S. Pat. No. 6,278,783, which claims the benefit of U.S. provisional patent application No. 60/087,826, filed on Jun. 3, 1998); this application is also a continuation-in-part of U.S. non-provisional patent application Ser. No. 09/737,182, filed on Dec. 13, 2000, now U.S. Pat. No. 6,381,699 (which is a divisional of U.S. non-provisional patent application Ser. No. 09/224,682, filed on Dec. 31, 1998, now U.S. Pat. No. 6,304,658, which claims the benefit of U.S. provisional patent applications No. 60/089,529, filed on Jun. 15, 1998, and 60/070,344, filed on Jan. 2, 1998).

FIELD

This application relates generally to cryptographic systems and, more specifically, to determining useful information about a cryptographic system by external monitoring of its cryptographic operations.

BACKGROUND

As described in U.S. Pat. No. 4,908,038 to Matsumura et al., cryptographic devices can be attacked using information gathered by observing the timing of comparison operations performed by such devices during their operation. For example, if a MAC (Message Authentication Code) algorithm is strong and the key is secure, forging a MAC should require $O(2n)$ attempts (where n is the MAC length in bits), but a device using a vulnerable MAC validation process is vulnerable to an $O(n)$ timing attack.

If timing is the only source of leaked information, securing the device is often relatively straightforward. Previously known countermeasures to attacks involving information leaking from cryptosystems employ large and often expensive physical shielding and/or careful filtering of inputs and outputs (e.g., U.S. government Tempest specifications). Unfortunately, these techniques are difficult to apply in constrained engineering environments. For example, physical constraints (such as size and weight), cost, and the need to conserve power can often prevent the use of such techniques. It is also known to use certain computational techniques (e.g., see Matsumura, above, or P. Kocher, "Timing Attacks on Implementations of Diffie-Hellman, RSA, DSS, and Other Systems," *Advances in Cryptology—CRYPTO '96*, Springer-Verlag, 1996, pages 104–113) to equalize timing. However, sources of information leakage other than timing (e.g., a device's power consumption) provide other avenues of attack. Indeed, Matsumara's timing equalization system itself can be vulnerable to non-timing attacks, for example by analyzing power consumption to detect the start of processing delays. It would therefore be advantageous to protect the devices' internal operations themselves instead of (or in addition to) simply externally masking the devices' timing (or other) fluctuations.

SUMMARY

Information leaked from smart cards and other tamper resistant cryptographic devices can be statistically analyzed to determine keys or other secret data. A data collection and analysis system is configured with an analog-to-digital converter connected to measure the device's consumption of electrical power, or some other property of the target device, that varies during the device's processing. As the target device performs cryptographic operations, data from the A/D converter are recorded for each cryptographic operation. The stored data are then processed using statistical analysis, yielding the entire key, or partial information about the key that can be used to accelerate a brute force search or other attack.

Particularly serious sources of leakage include the device's power consumption and electromagnetic radiation. Observation of the microprocessor's power consumption can reveal whether the jumps are taken. Observation of the power consumption and/or timing can reveal whether the carried bits in the key rotates of each DES round equal zero or one. Operations that change the device state can reveal information about the initial and final states of the operations. Signals radiated from the address and data bus lines connecting a device to memory can be detected and analyzed to gain information which in turn can compromise the keys. Variations between individual transistors in an integrated circuit, variations in the electrical properties of wires within a chip, variations in the amount of electromagnetic radiation emitted by different wires, etc. can all provide variations that can be analyzed statistically to determine secret keys.

In an exemplary embodiment, the attack collects a small amount of data related to the key each time the token is observed performing a cryptographic operation involving the key. The amount of information known about the key is increased by collecting and statistically correlating (or combining) data from multiple observations of the token as it performs operations involving the key (or related key).

In the case of a cryptosystem which is leaking information, such observations may contain signal (i.e., information correlated usefully to the key). However, such observations also contain noise (i.e., information and error that hinder or are irrelevant to determination of the key). The quality of the information gained from these observations is characterized by a "signal to noise" (or S/N) ratio, which is a measure of the magnitude of the signal compared to the amount of noise.

The number of operations needed to recover the key depends on the measurement and analysis techniques, but is generally inversely proportional to the square of the S/N ratio. The constant of proportionality also depends upon the amount of confidence required. For example, data of a relatively low confidence level may be acceptable if used to guide an optimized brute force search using statistical information about key bit values. If a countermeasure is used that decreases the signal or increases the amount of measurement noise by, for example, a factor of 300, the statistical attack can generally still succeed but would be expected to require roughly 90,000 times as many observations to extract the same amount of information about the key. An attack requiring 1,000 observations to recover a key before the S/N reduction would now yield the same level of confidence in the recovered key by using on the order of 90 million observations.

After making a large number of measurements, the signal-to-noise ratio may be improved by an attacker or evaluator using methods such as aligning these measurements so that the data points corresponding to a single point of interest can be compared and analyzed across a large number of observations. Averaging data collected from many operations can be an effective means of amplifying signals and filtering out noise.

In one embodiment, the evaluator guesses the value of some of the bits of the key, computes an average, checks whether expected biases appear (or uses another statistical technique and check for other expected effects) in collected data, and iterates this process with multiple guesses to recover the entire key. In some cases, disconnecting the power or resetting a device during an operation, may be helpful in compromising secrets by allowing a single leaky operation to be performed repeatedly.

DETAILED DESCRIPTION

Figure 1:
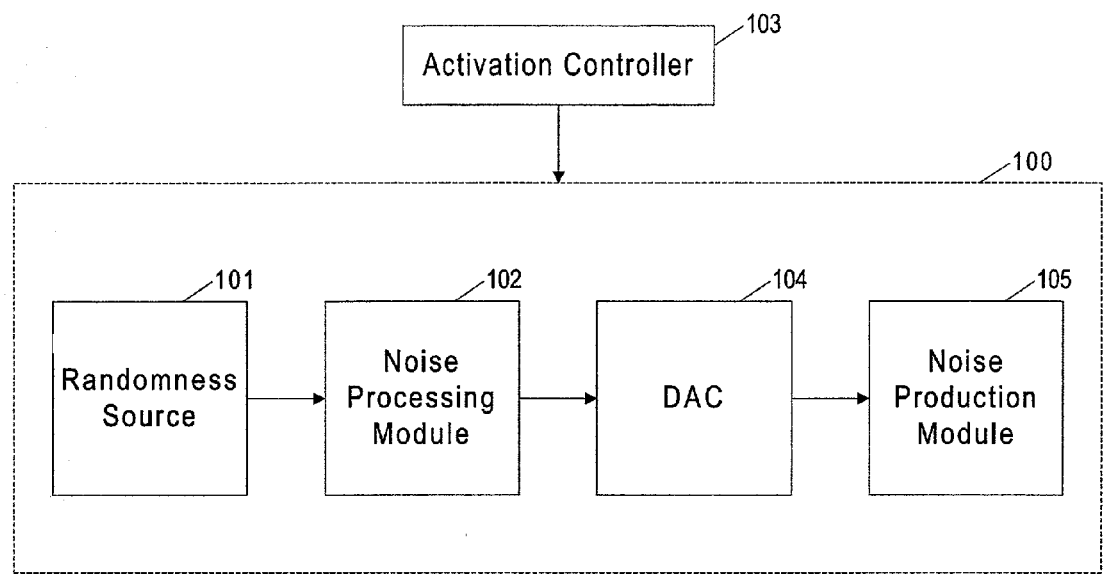
FIG. 1 illustrates an exemplary apparatus for introducing noise into a cryptosystem.

This application discloses both external monitoring techniques (e.g., attacks against cryptosystems), as well as techniques for using unpredictable information to protect cryptosystems against such external monitoring techniques.

External Monitoring Techniques

The external monitoring techniques operate on the principle that information leaked from smart cards and other tamper resistant cryptographic devices can be statistically analyzed to determine keys or other secret data. A data collection and analysis system is configured with an analog-to-digital converter connected to measure the device's consumption of electrical power, or some other property of the target device, that varies during the device's processing. As the target device performs cryptographic operations, data from the A/D converter are recorded for each cryptographic operation. The stored data are then processed using statistical analysis, yielding the entire key, or partial information about the key that can be used to accelerate a brute force search or other attack.

Particularly serious sources of leakage include the device's power consumption and electromagnetic radiation. Observation of the microprocessor's power consumption can reveal whether the jumps are taken. Observation of the power consumption and/or timing can reveal whether the carried bits in the key rotates of each DES round equal zero or one. Operations that change the device state can reveal information about the initial and final states of the operations. Signals radiated from the address and data bus lines connecting a device to memory can be detected and analyzed to gain information which in turn can compromise the keys. Variations between individual transistors in an integrated circuit, variations in the electrical properties of wires within a chip, variations in the amount of electromagnetic radiation emitted by different wires, etc. can all provide variations that can be analyzed statistically to determine secret keys.

In an exemplary embodiment, the attack collects a small amount of data related to the key each time the token is observed performing a cryptographic operation involving the key. The amount of information known about the key is increased by collecting and statistically correlating (or combining) data from multiple observations of the token as it performs operations involving the key (or related key).

In the case of a cryptosystem which is leaking information, such observations may contain signal (i.e., information correlated usefully to the key). However, such observations also contain noise (i.e., information and error that hinder or are irrelevant to determination of the key). The quality of the information gained from these observations is characterized by a "signal to noise" (or S/N) ratio, which is a measure of the magnitude of the signal compared to the amount of noise.

The number of operations needed to recover the key depends on the measurement and analysis techniques, but is generally inversely proportional to the square of the S/N ratio. The constant of proportionality also depends upon the amount of confidence required. For example, data of a relatively low confidence level may be acceptable if used to guide an optimized brute force search using statistical information about key bit values. If a countermeasure is used that decreases the signal or increases the amount of measurement noise by, for example, a factor of 300, the statistical attack can generally still succeed but would be expected to require roughly 90,000 times as many observations to extract the same amount of information about the key. An attack requiring 1,000 observations to recover a key before the S/N reduction would now yield the same level of confidence in the recovered key by using on the order of 90 million observations.

After making a large number of measurements, the signal-to-noise ratio may be improved by an attacker or evaluator using methods such as aligning these measurements so that the data points corresponding to a single point of interest can be compared and analyzed across a large number of observations. Averaging data collected from many operations can be an effective means of amplifying signals and filtering out noise.

In one embodiment, the evaluator guesses the value of some of the bits of the key, computes an average, checks whether expected biases appear (or uses another statistical technique and check for other expected effects) in collected data, and iterates this process with multiple guesses to recover the entire key. In some cases, disconnecting the power or resetting a device during an operation, may be helpful in compromising secrets by allowing a single leaky operation to be performed repeatedly.

The foregoing external monitoring techniques are described in more detail in the following U.S. patents and patent applications, all of which are hereby incorporated by reference herein in their entirety: U.S. non-provisional patent application Ser. No. 09/326,222, filed on Jun. 3, 1999, now U.S. Pat. No. 6,327,661 (which claims the benefit of U.S. provisional patent application No. 60/087,880, filed on Jun. 3, 1998); U.S. non-provisional patent application Ser. No. 09/930,836, filed on Aug. 15, 2001 (which is a continuation of U.S. non-provisional patent application Ser. No. 09/324,798, filed on Jun. 3, 1999, now U.S. Pat. No. 6,278,783, which claims the benefit of U.S. provisional patent application No. 60/087,826, filed on Jun. 3, 1998); and U.S. non-provisional patent application Ser. No. 09/737,182, filed on Dec. 13, 2000, now U.S. Pat. No. 6,381,699 (which is a divisional of U.S. non-provisional patent application Ser. No. 09/224,682, filed on Dec. 31, 1998, now U.S. Pat. No. 6,304,658, which claims the benefit of U.S. provisional patent applications No. 60/089,529, filed on Jun. 15, 1998, and 60/070,344, filed on Jan. 2, 1998). This application is formally a continuation-in-part application of each of the foregoing patents and patent applications; however, no new matter has been added over the combination thereof.

The techniques for protecting cryptosystems (i.e., countermeasures) are described in various embodiments as set forth below. Although these embodiments differ in the details of their implementations, those skilled in the art will appreciate the fundamental commonality in their essential operation—using randomness or other sources of unpredictability to decorrelate secret information from externally monitorable signals in such a way that deters external monitoring attacks (including those involving statistical accumulation and analysis of collected data) upon cryptographic systems.

Reduction of Signal-to-Noise Ratios

Unless noted otherwise, it shall be assumed herein that leakage (or the reducing, masking, or minimizing thereof) refers to the leakage (or the reducing, masking, or minimizing thereof) of any information that is potentially useful to an attacker trying determine secret information. Thus, the leaked information includes the secret information itself, but also other information pertaining to that secret information. Of course, the attacked device may also leak information, such as information correlated to its internal processing operations, that is not useful to attackers. However, such leakage of non-useful information is not relevant to this description of countermeasures.

To obtain a secret key from a cryptosystem that leaks information, an attacker can gather data by observing a series of operations, perform statistical analysis on the observations, and use the results to determine the key. In a common situation, an attacker monitors a physical property, such as power consumption, of a secure token as it performs a cryptographic operation. The attacker collects a small amount of data related to the key each time the token is observed performing a cryptographic operation involving the key. The attacker increases the amount of information known about the key by collecting and statistically correlating (or combining) data from multiple observations of the token as it performs operations involving the key (or a related key).

In the case of a cryptosystem which is leaking information, such observations may contain signal (i.e., information correlated usefully to the key). However, such observations also contain noise (i.e., information and error that hinder or are irrelevant to determination of the key). The quality of the information gained from these observations is characterized by a "signal to noise" (or S/N) ratio, which is a measure of the magnitude of the signal compared to the amount of noise.

The number of operations that the attacker must analyze to recover the key depends on the measurement and analysis techniques, but is generally inversely proportional to the square of the S/N ratio. The constant of proportionality also depends upon the amount of confidence the attacker requires. For example, a relatively low confidence level may be acceptable to an attacker willing to do an optimized brute force search using statistical information about key bit values. Decreasing the signal by a factor of 15 and increasing the amount of measurement noise by a factor of 20 will reduce the signal-to-noise ratio by a factor of 300. This will generally mean that an attacker will require roughly 90,000 times as many observations to extract the same amount of information about the key. An attack requiring 1,000 observations to recover a key before the S/N reduction would now require on the order of 90 million observations to gain the same level of confidence in the recovered key.

Thus, one approach according to the general technique of using unpredictable information to protect cryptosystems against external monitoring attacks is to implement cryptographic protocols so as to produce unpredictable state information, thereby increasing the number of observations required by an attacker to compromise a key. By reducing the available signal size and/or increasing the amount of error, noise, and uncertainty in attackers' measurements, a system designer can make the so-called work function (effort required) to break a system larger.

The system can be made even more secure by making the number of samples required to gain any significant amount of useful key information exceed the maximum number of transactions that can be performed using the key, exceed the number of transactions that can be performed by the device (e.g., before the key expires), or else be so large that monitoring attacks are comparable to (or of greater difficulty than) brute force and other known attacks. For example, consider a system programmed to self-destruct after one million operations—well beyond the expected operational life of most smartcards. If a design not using the countermeasures requires five operations to break, and the countermeasures reduce the signal-to-noise ratio by a factor of 1000, the number of operations required to break the system (i.e., isolate the signal or key from the noise) might increase by a factor of roughly one million (i.e., to approximately 5 million) exceeding the lifetime of the secret or the device. Thus, attackers will be unable to collect enough measurements to compromise the secret.

Random Noise Generation

An exemplary apparatus for introducing noise into a cryptosystem is illustrated in FIG. 1. In FIG. 1, noise production system 100 includes randomness source 101, noise processing module 102 (such as, without limitation, a linear feedback shift register or a hash function-based compression function), activation controller 103, digital/analog converter 104, and noise production module (105). Other noise production systems including none, any, or all of the components of FIG. 1 can also be used within the scope of the countermeasures.

Randomness source 101 creates the initial noise used to generate unpredictable information. Randomness source 101 can be implemented in hardware or software. It is preferable that the random number generator be implemented in hardware because hardware implementations typically maintain less state information that can be subject to attack. If random numbers are generated via software, care should be taken to ensure that attackers cannot compromise the random number generator state and predict future random number generator outputs. For example, to help make a software random number generator resist external monitoring attacks, an implementation may incorporate extra state information and update its state frequently. Of course, as will be appreciated by those skilled in the art, truly random numbers are not always necessary or available. Therefore, as used herein, any term described as "random" will be understood to include truly random, and also pseudorandom or otherwise unpredictable, information suitable to, and depending on, the nature of the particular application at hand.

Where randomness source 101 is an analog source, its output is first converted to digital form, for example using digital/analog converter 104. The digital output produced by randomness source 101 or digital/analog converter 104 is then provided as an input to noise processing module 102. Noise processing module 102 converts the initial noise (which may be biased or have other nonrandom characteristics) into either statistically random noise or noise with desired characteristics (for example, random but with a non-linear statistical distribution).

Many cryptosystems spend a relatively small fraction of total processing time performing security-critical operations. Therefore, the activation controller 103 can be configured so that the noise production process is activated during operations in which security is important (such as, without limitation, encryption, decryption, digital signing, data comparison, MAC verification, code verification, audit log updating, EEPROM update, and key changing), but is deactivated during non-security critical operations. A noise production activation control can thus greatly reduce many of the potential disadvantages of such a noise system (such as increased power consumption, reduced performance, increased electromagnetic radiation, decreased reliability, increased heat production, etc.). Activation controller 103 can be implemented in any of a variety of ways, including without limitation in a microprocessor cryptographic accelerator, or other well-known controller device that disables power to one or more elements of noise production system 100, forces the output of randomness source 101 (or mixer) to a particular value, forces the input or output of digital/analog converter 104 to a particular value, or disables noise production module 105.

When activation controller 103 enables noise production system 100, random output from noise processing module 102 is provided to digital/analog (D/A) converter 104. The D/A output is provided to noise production module 105, which is configured to sink power, produce electromagnetic radiation, or otherwise introduce noise into attackers' measurements, where the noise produced is a function of the D/A input. The noise production module thus introduces noise into attackers' measurements, increasing the difficulty of external monitoring attacks. Digital/analog conversion methods are known in the background art, and need not be described in detail here. For example, an array of current sources (e.g., transistors) and/or current sinks (e.g., resistors), as well as many other well known techniques can be used.

In an embodiment where randomness source 101 is an analog noise source, noise production module 105 can operate using the output of randomness source 101 as a direct input. Activation controller 103 can then operate by regulating the output of randomness source 101 or enabling and disabling noise production module 105.

To prevent noise from being observably correlated to clock transitions or other externally-measurable events, multiple noise production modules may be deployed and driven simultaneously from the same or different random sources. Alternatively, the noise processing module can be used to combine outputs from multiple noise sources and/or provide inputs to multiple noise production modules. Also, because microprocessor current usage profiles (and other externally measurable characteristics such as E/M radiation) are instruction-dependent and carry significant detail within each clock period, it may be advantageous to drive noise production modules faster than (or independently from) the clock rate applied to cryptosystem microprocessor. For example, noise production modules may include delay lines that temporally isolate their outputs from those of the others, or they may be clocked independently, or they may be free-running.

All of the foregoing components may be implemented separately or in various combinations, using analog or digital techniques as appropriate. Those skilled in the art will also appreciate that various of the components can be implemented in hardware, or even software, although hardware implementations will generally provide greater security. For example, the noise source can be integrated within the cryptosystem microprocessor itself. In single-chip environments (such as smartcards and secure microprocessors), the noise source and noise control circuitry can be integrated into the same chip that contains the microprocessor, secure memory, I/O interface, etc.

The signal-to-noise reduction techniques described herein may be implemented for use in various environments, including without limitation key management and storage systems, cryptographic accelerators (e.g., hardware DES implementations, multipliers, fast modular exponentiators, hash functions, etc.), nonvolatile memory (e.g., EEPROM, flash, etc.), data communication interfaces, buses, and (as will be evident to one of ordinary skill in the art) other computational devices and methods used in cryptographic operations.

Clock Skipping

Another approach to the general technique of using unpredictable information to protect cryptosystems against external monitoring attacks involves what will be referred to herein as clock skipping (or clock decorrelation).

During statistical attacks using power consumption or electromagnetic radiation, attackers typically compare measurements from several different operations against each other. For example, an attacker might make a sequence of observations by sampling the target device's power consumption at 200 MHz during a 5 ms portion of each of 1,000 cryptographic operations done by the target device. For this exemplary attack, 1,000 observations each containing 1,000,000 data points are thus collected. The attacker would then align these measurements so that the data points corresponding to a single point of interest can be compared and analyzed across a large number of observations.

Therefore, security can be improved by preventing attackers from locating points of interest within collected data sets and from identifying corresponding regions between observations. Indeed, causing an attacker to include incorrectly-aligned data is one way to decrease the effective signal-to-noise ratio of the attacker's data (see previous section), since the noise increases significantly (due to the inclusion of uncorrelated samples) and the useful signal decreases (due to the presence of fewer good samples).

Without accurate temporal alignment, the temporal resolution of the attacker's observations decreases greatly, making it much more difficult for the attacker to identify a signal containing fine structure. For example, a "1" bit in a secret or private cryptographic key might statistically result in a power feature consisting of a 1 µA increase above average for 2 µs followed immediately by a decrease to 2 µA below average for 1 µs, while a "0" key bit might result in a power feature consisting of a 1 µA decrease below average for 2 µs followed by a 2 µA increase above average for 1 µs. Differentiating such signals is easy with sub-microsecond resolution, but can be extremely difficult or impossible with only millisecond resolution unless an extraordinarily large number of samples is taken. Of course, small temporal alignment variations may not be able to conceal signal characteristics that are of large amplitude or of long duration (e.g., comparable to or larger than the size of the alignment variations). In general, then, poor temporal alignment will reduce an attacker's ability to identify fine variations within operations and significantly increase the number of measurements required for a successful attack.

Many conventional systems, including commonly available smartcards, simply use external clocks for their cryptographic operations—even though attackers can freely observe and manipulate the external clock. This greatly facilitates the ability of attackers to make the measurements necessary to attack the system. One embodiment of the countermeasures uses clock skipping (or clock decorrelation) to inhibit such attacks by reducing attackers' ability to predict the system state. Clock skipping involves decorrelating cryptographic operations from the normal (external) clock cycles by creating a separate, internal clock signal that is used to control processor timing during cryptographic operations. While externally-measurable characteristics (particularly power consumption and electromagnetic radiation) can reveal when some internal clock cycles occur, clock skipping will make them much more difficult for an attacker to accurately locate points of interest in measurements, particularly if noise is introduced into the signal using the techniques disclosed herein. This will be described in more detail below with respect to an exemplary embodiment illustrated in FIG. 2.

Figure 2:
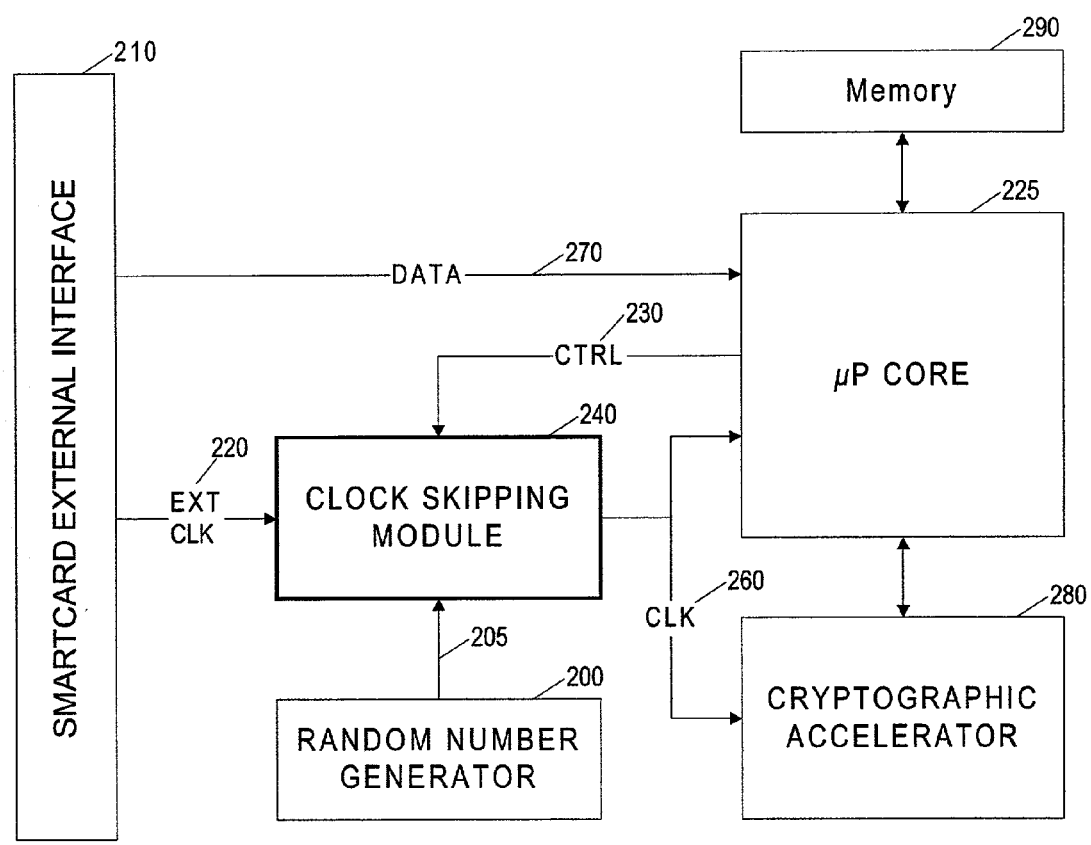
FIG. 2 illustrates an exemplary apparatus for implementing clock skipping.

Referring now to FIG. 2, random number generator 200 (which can be, but need not be, implemented in hardware) is used to determine which clock cycles (or clock state transitions) are to be used by microprocessor core 225. Random number generator 200 produces a stream of random (or pseudorandom) digital output bits or analog noise as random output 205. Clock skipping module 240 then combines (as will be described below) random output 205 with clock signal 220 received from external smartcard interface 210. Of course, clock signal 220 can also originate from another source (for example, if the technique is implemented in environments other than smartcards). In embodiments where random number generator 200 itself uses an external clock signal (e.g., where a random bit is output on each clock state transition), random number generator 200 can, but need not, use clock signal 220.

Within clock skipping module 240, random output 205 is used to select cycles of clock signal 220 to skip in order to produce clock signal 260. Alternatively, random output 205 can be used to select the closest corresponding cycles of clock signal 220 to be used as clock signal 260, or random output 205 can even be used as clock signal 260 itself. Still other approaches are possible, as will be appreciated by those skilled in the art; the basic point being that clock signal 260 be (partially or wholly) decorrelated from external clock signal 220 via random output 205.

If desired, clock skipping module 240 can optionally apply a filter to clock signal 260 to ensure desired characteristics. For example, to ensure a minimum clock rate (as opposed to a statistical average), a transition of clock signal 260 may be forced after more than a threshold number of cycles of clock signal 260 have been skipped, either recently or consecutively (e.g., a transition of clock signal 260 can be forced if clock signal 260 has not changed during more than three transitions of clock signal 220.)

Additionally, clock skipping module 240 can optionally monitor the clock rate (of either clock signal 220 or 260) to prevent attackers from stopping the clock and analyzing the device in a halted state or from operating the device too quickly. When module 240 detects such a clock fault, it can reset microprocessor core 225, clear memory 290 (which can be nonvolatile RAM, such as battery-backed CMOS, EEPROM, flash memory, a hard disk, or other such storage used to store the key and/or other information), clear the state of cryptographic accelerator 280, and log the fault in memory 290. Methods and apparatuses for detecting such clock faults are well known in the background art and need not be described in detail here.

In an alternative embodiment, clock skipping module 240 and microprocessor 225 are combined, such that random output 205 can force microprocessor 225 to skip clock cycles. For example, when microprocessor 225 is directed to skip a clock cycle (such as when three output bits equal to zero are received in random output 205), the result of the current or next instruction (or clock cycle) executed by the microprocessor is discarded and repeated.

In all of the foregoing, it should be noted that the fraction of skipped clock cycles does not need to be very large; for example and without limitation, even skipping as few as one clock cycle in 20 (on average) will introduce significant measurement drift.

One consideration introduced by clock skipping is the effect on other functions of the system besides the cryptographic operations. In particular, clock skipping may sometimes adversely affect operations requiring regular clock cycles. For example, in many smartcards, one bit is sent or received on a serial I/O (input/output) line every 372 cycles of the external clock. (Thus, a 3.579545 MHz external clock is compatible with a serial communication rate of 9600 bits per second.) However, with clock decorrelation, microprocessor 225 will operate at a different clock rate governed by signal 260. A mismatch between the data communications clock rate and the microprocessor clock rate may result, causing I/O errors to occur. Consequently, in devices implementing clock skipping, it is often advantageous for the microprocessor to be controlled by external clock 220 during I/O operations.

This can be implemented via clock skipping activation signal 230, which is used to select between external clock signal 220 and the (modified) internal clock that would otherwise be produced by clock skipping module 140. As with the noise generator activation signal of FIG. 1, clock skipping activation signal 220 can be produced by a microprocessor or any other control device that is capable of knowing when to apply (or not apply) the clock skipping. Selection of whether or not to clock skip at any particular time can be performed by many well-known techniques that need not be described in detail here. For example, in the exemplary embodiment of FIG. 2, microprocessor 225 is well suited for such a task because it is necessarily aware of I/O operations associated with the receipt of data signals 270. In general, when I/O is performed or when other non-security-critical operations are in progress, microprocessor core 225 can assert control signal 230 to cause clock skipping module 240 to ignore random output 205 and provide external clock signal 220 directly as clock signal 260. Control signal 230 and the noise production activation control signal described previously can, but need not be the same signal.

In an alternative solution to the synchronization failure problem, two separate clocks are used. A conventional external clock signal is used for I/O and other processing, where clock skipping is not needed to protect secret information. However, an internal clock signal, preferably but not necessarily generated in the device (for example, produced using a ring oscillator, which is well known in the background art), is used for internal (e.g., cryptographic) processing. Thus, internal operations need not proceed at a speed related to or derived from the external clock rate. The internal clock may be distorted or skipped, for example, as described above. Alternatively, or in addition, where an analog process is used to generate the internal clock, significant sources of randomness can also be incorporated to adjust the frequency, drift, and jitter of the clock signal to prevent accurate prediction of clock state transitions. Clock signal selection can be performed by microprocessor 225 as mentioned previously. Another technique, which is especially suitable for, but not limited to smartcards, uses a UART (universal asynchronous receiver/transmitter) or other buffer between the internally clocked region and the external I/O interface to ensure that communications over the external serial I/O interface are clocked at a rate corresponding to the externally-supplied clock but may be accessed reliably by internally-clocked circuits.

In yet another approach, the internally-generated clock signal can be derived from the external clock signal. This can be performed via an analog phase-locked loop, which is well known in the background art and need not be described in detail here. Such an internal clock will be rather closely correlated with the external clock, and therefore not as effective against attacks as the randomized clock signal or two separate clocks described previously. (Of course, its effectiveness can be improved by optionally using clock skipping or analog (or other) noise sources to adjust the frequency, drift, and jitter of its signal.) Also, when synthesizing the internal clock from the external clock, the clock-derivation circuitry can be configured to restrict the rate of the internal clock frequency, for example, to enforce a minimum internal clock frequency so that attackers cannot stop the clock and attack the device in the stopped state. The derived internal clock signal exhibits a number of useful properties that will be described in the following paragraph.

One useful property of such a slightly decorrelated internal clock is that it may be sufficiently close to the external clock that it may be used to control I/O rates reliably. In addition, because a phase-locked loop can continue to produce a valid clock signal even if the external clock changes or is removed, microprocessor 225 can continue operating so that it can detect and even respond to attacks that involve halting, removing, or altering the external clock while power is connected. The use of an internally-generated clock additionally provides protection against attacks involving the introduction of errors into computations. For example, jitter or high frequencies supplied to the external clock would cause harmless communication errors, but would be prevented from causing erroneous computations. Because a phase locked loop can produce an internal clock signal that is a multiple of the external clock signal, it is possible to clock cryptographic operations at a rate faster than the external clock, providing improved performance. In smartcards with challenging performance requirements (such as those that run interpreted codes such as Java), this is an added benefit.

All of the foregoing paragraphs describe various ways to generate a second, internal clock signal: via randomization, via a separate clock, or via derivation from the external clock. In all of these cases, the internal clock can also be used to monitor the external clock to detect abnormalities introduced by attackers. Regardless of whether the clock is produced internally or derived from the external clock, the microprocessor can have the option of selecting between multiple clock modes. For example, a slower mode might be used if it has a lower probability of computation error, a faster mode might be used when improved performance is needed, and clock skipping or other clock distortion might be activated when resistance to external monitoring attacks is desired.

Much of the foregoing has been described with respect to hardware techniques for clock decorrelation (e.g., second clocks or phase-locked loops), but clock decorrelation can also be effected by software as will be described below. This is useful, for example, where the environment does not allow for hardware-based clock skipping. Alternatively, hardware clock decorrelation could be supplemented with software-based clock decorrelation for even greater protection in security critical code segments.

One efficient software-implementable technique for clock decorrelation takes advantage of the fact that the amount of time used for a process with a conditional jump can vary depending on whether or not the jump is actually performed. In such cases, inserting branch delays can be used as a form of clock decorrelation. For example, the assembly language clock randomizer below uses a random generator to introduce clock variations that can help prevent accurate alignment by an attacker:

```
Assembly Language Clock Randomizer:

[...]
inp reg5,RANDOM_GENERATOR    # get a random byte
add reg5,reg5                # shift reg5 left once
brc delay1                   # branch if carry
nop                          # extra delay if bit is 0
delay1:                      # continue execution
[...]                        # ... more code ...
add reg5,reg5                # shift reg5 left again
brc delay_2                  # branch if carry
    # put any code here      # obfuscating code/delay
delay2:                      # continue execution
[...]                        # ... more code ...
```

In an alternative embodiment, instead of using random information to determine whether to take a delay branch, the random information may be used to select between parallel code processes, such that the same cryptographic result will be produced regardless of which code process is selected but where the parallel processes perform different operations toward producing the result.

This section has described temporal obfuscation techniques that are useful in preventing reliable identification and alignment of specific features in measurements of cryptographic device characteristics such as power consumption and electromagnetic radiation. However, such techniques may not always be sufficient for preventing attacks based on timing, since introduced timing delays will have a predictable statistical distribution for which attackers can compensate. Another embodiment of the general technique of implementing cryptographic protocols using unpredictable information, described below, is useful in (but is not limited to) such contexts.

Execution Path and Operation Order Entropy

Another approach to the general technique of using unpredictable information to protect cryptosystems against external monitoring attacks involves the introduction of entropy into the order of processing operations or into the execution path while maintaining desired functionality (such as compatibility with standard cryptographic algorithm definitions). More specifically, a device can use a random number generator to cause unpredictability in the order of performing a sequence of suboperations. If attackers cannot accurately determine the order in which operations were performed, cross-correlation between samples becomes more difficult or impossible. Consequently the data collected by an attacker effectively has a significantly lower signal-to-noise ratio.

As an illustrative example of operation order entropy, consider a bit permutation. Permutations are widely used in cryptography, for example in the Data Encryption Standard and other cryptographic algorithms. The following C language pseudocode illustrates a traditional method of implementing a permutation.

```
Input-Ordered Permutation (Background Art):

void perm2(bool dataIn[64], bool dataOut[64], int table1[64]) {
    int i;
    for (i = 0; i < 64; i++) {
        dataOut[table1[i]] = dataIn[i];
    }
}
```

This example is input-ordered, meaning that processing steps are performed in the order (or inverse order) in which the input bits are supplied. In the example, input bit 0 is permuted first, and input bit 63 is permuted last. Output-ordered permutations are also commonly used in the background art. Provided that table1 is a permutation (i.e., where one element equals each of the values 0 . . . 63), the pseudocode below can be made output-ordered by changing the statement inside the loop to read: "dataout[i]=dataIn[table 2[i]];", where table2 is output-ordered (i.e., table 2 is the inverse of table1 above such that table1[table2[i]]=i).

However, both output-ordered and input-ordered permutations can leak information about the data they process. For example, in the input-ordered permutation, attackers' measurements of loop iteration i will be correlated to dataIn[i]. In the output-ordered permutation, the attackers' measurements of loop iteration i will be correlated to dataOut[i]. An improved permutation method would thus be advantageous. One exemplary implementation of such a method is shown in the table below. This high-entropy permutation combines several previously-described aspects of the countermeasures, including without limitation order randomization (thus being neither input-ordered nor output-ordered) and blinding techniques (to conceal further the data being permuted).

Blinded High-Entropy Permutation:

```
#define SWAP(a,b) { register int t = a; a = b; b = t; }
#define LOOPCOUNT 128
void perm3(bool dataIn[64], bool dataOut[64], int table[64]) {
    unsigned char trueRandom(void);      /* gives random byte */
    int i,p;
    int perm[64];
    bool b, temp[64];
    /* Initialize random permutation */
    for (i = 0; i < 64; i++) {
        perm[i] = i;
        temp[i] = trueRandom( ) & 1;
        dataOut[i] = trueRandom( ) & 1;
    }
    for (i = 0; i < LOOPCOUNT; i++) {
        p = trueRandom( ) & 63;      /* random number mod 64 */
        SWAP(perm[p], perm[i&63]);
    }
    /* Blind: temp=blinded input, dataOut=unblinding factor */
    for (i = 0; i < 64; i++) {
        p = perm[i];
        b = (bool) (trueRandom( ) & 1);
        temp[p] = dataIn[p] ^ b;
        dataOut[table[p]] = b;
    }
    for (i = 0; i < LOOPCOUNT; i++) {
        p = trueRandom( ) & 63;      /* random number mod 64 */
        SWAP (perm[p], perm[i&63]);
    }
    /* Perform the permutation on temp & unblind */
    for (i = 0; i < 64; i++) {
        p = perm[i];
        dataOut[table[p]] ^= temp[p];
        temp[p] = 0;
    }
}
```

The magnitude of signals leaked due to variations in data values (e.g., registers and memory contents) is usually smaller (often by a factor of several orders of magnitude) than signals leaked due to branches and variations in the execution path. Therefore, the high-entropy permutation operation, above, uses a constant execution path to inhibit leakage via variations in the execution path.

The exemplary blinded randomized-order permutation operation includes four steps, which can be performed separately or simultaneously: initialization, blinding, permutation, and unblinding. Implementations using partial blinding, which operate on already-blinded values, or those with reduced security requirements will not require all steps.

Initialization of the blinded randomized-order permutation operation involves constructing and randomizing a permutation table ("perm") for determining the bit order for operations. (Bit order permutation table "perm" randomizes the time at which any particular data bit is manipulated.) The bit order table is created in two passes, where the first assures that the table has the correct form (i.e., contains the numbers zero through 63), and the second introduces random order into the table. Because the process of constructing the bit order table does not involve any secret inputs, the only security requirement for the process is that the final result be unknown to attackers. As illustrated, the first permutation table initialization loop can also place random values into dataOut and temp to help whiten any leaked signals when data values are first stored in these arrays. Finally, although it is not required, more than 64 iterations of the randomization loop are used to ensure that any statistical biases remaining after the randomization loop are insignificantly small.

The next section of the code performs the blinding operation. First, for each loop iteration, a random number generator produces a random blinding bit. The temporary buffer (temp) is initialized with the XOR of the random bit and an input data bit, where the input data bit is selected according to the table (perm) constructed previously. Additionally, the output buffer (dataout) is initialized with the blinding bit, where the dataout bit is the result of using the input permutation table to operate on the index to temp. The second part of the blinding process re-randomizes the bit order permutation table (perm).

The last section performs the final bit permutation and unblinding steps. Input bits are loaded in the order specified by the table (perm), permuted according to the (non-secret) externally-specified permutation table (table), and XORed onto the destination table (dataout).

Note that the leak-minimized permutation operation described dramatically reduces the amount of information leaked from a permutation operation, but is not necessarily expected to reduce such leakage to zero. The input data to the function arrives in fixed order and unblinded form, and the output is similarly supplied unblinded in fixed order. Consequently, two or more measurements from the same transaction might (for example) be correlated to each other such that the strength or sign of the correlation is a function of one or more input or output data bits. If inputs and/or outputs must be kept secret or if multiple permutations are to be performed on the same secret data (for example, through a multi-step operation such as encryption), operands can be maintained in a blinded state during processing, to be (partially or completely) reconstituted only when nonlinear operations must be performed or at the end of the computation.

Note that many variations on the process described are possible, as will be understood to those skilled in the art. For example and without limitation, the number of bits manipulated does not need to equal 64, the order of steps may be changed, steps can be removed for simplified implementations (such as those that are not subject to some attacks), steps can be modified, different permutation generation and update processes can be used, and additional steps can be added.

Other Considerations

Cryptographic operations should normally be checked to ensure that incorrect computations do not compromise keys or enable other attacks. Cryptographic implementations of the countermeasures can be, and in a preferred embodiment are, combined with error-detection and/or error-correction logic to ensure that cryptographic operations are performed correctly. For example, a simple and effective technique is to perform cryptographic operations twice, ideally using two independent hardware processors and/or software implementations, with a comparison operation performed at the end to verify that both produce identical results. If the results produced by the two units do not match, the failed comparison will prevent the defective processing result from being used. In situations where security is more important than reliability, if the compare operation ever fails (or fails too many times) the device may self-destruct (such as by deleting internal keys) or disable itself. For example, a device might erase its key storage memory if either two defective DES operations occur sequentially or five defective DES results occur during the lifetime of the device. In some cryptosystems, full redundancy is not necessary. For example, with RSA, methods are known in the background art for self-checking functions that can be incorporated into the cryptosystem implementation (e.g., RSA signatures can be verified after digital signing operations).

Detection of conditions likely to cause incorrect results may also be used. In particular, active or passive sensors to detect unusually high or low voltages, high-frequency noise on voltage or signal inputs, exposure to electromagnetic fields and radiation, and physical tampering may be employed. Inappropriate operating conditions can (for example) trigger the device to reset, delete secrets, or self-destruct.

Self-diagnostic functions such as a POST (power-on-self-test) should also be incorporated to verify that cryptographic functions have not been damaged. In cases where an ATR (answer-to-reset) must be provided before a comprehensive self-test can be completed, the self-test can be deferred until after completion of the first transaction or until a sufficient idle period is encountered. For example, a flag indicating successful POST completion can be cleared upon initialization. While the card is waiting for a command from the host system, it can attempt the POST. Any I/O received during the POST will cause an interrupt, which will cancel the POST (leaving the POST-completed flag at zero). If any cryptographic function is called, the device will check the POST flag and (if it is not set) perform the POST before doing any cryptographic operations.

Conclusions

The countermeasures are extremely useful for improving security, particularly in environments and applications with difficult engineering requirements, by enabling the construction of devices that are significantly more resistant to attack than devices of similar cost and complexity that do not use such countermeasures. Also, multiple security techniques may be required to make a system secure. For example, leak minimization and obfuscation may be used in conjunction with other security methods or countermeasures.

As those skilled in the art will appreciate, the techniques described above are not limited to particular host environments or form factors. Rather, they may be used in a wide variety of applications, including without limitation: cryptographic smartcards of all kinds including without limitation smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems. All of the foregoing illustrates exemplary embodiments and applications of the countermeasures, from which related variations, enhancements and modifications will be apparent without departing from the spirit and scope of the family of countermeasures addressed hereby. Therefore, the scope of any claims directed to countermeasures should not be limited to the foregoing disclosure, but rather construed by any such claims appended hereto. Similarly, the foregoing also illustrates exemplary embodiments and applications of the external monitoring (e.g., attacks) against which countermeasures are disclosed, from which related variations, enhancements and modifications will be apparent without departing from the spirit and scope of the of the family of external monitoring techniques addressed hereby. Therefore, the scope of any claims directed to external monitoring techniques should not be limited to the foregoing disclosure, but rather construed by any such claims appended hereto.

What is claimed is:

1. A method for evaluating the security of a cryptographic device to recover useful information about a key, said device containing at least said key and a circuit configured to perform cryptographic operations using said key, said method comprising:

(a) connecting said device to an analog-to-digital converter configured to measure an attribute related to operation of said device;
   (b) sending a plurality of command sequences to said device, where each said command sequence causes said device to perform a cryptographic operation to process data using said key;
   (c) during processing of each said cryptographic operation, recording a plurality of measurements of said attribute by using said analog-to-digital converter; and
   (d) determining whether information about said key is leaking from said device by statistically combining said recorded measurements.

2. The method of claim 1 further comprising temporally aligning data points corresponding to a point of interest within said plurality of measurements.

3. A method for evaluating the security of a cryptographic device to recover useful information about a key, said device containing at least said key and a circuit configured to perform cryptographic operations using said key, said method comprising:
- (a) connecting said device to an analog-to-digital converter configured to measure electromagnetic radiation during operation of said device;
- (b) sending a plurality of command sequences to said device, where each said command sequence causes said device to perform a cryptographic operation to process data using said key;
- (c) during processing of each said cryptographic operation, recording a plurality of measurements of said radiation by using said analog-to-digital converter; and
- (d) determining whether information about said key is leaking from said device by statistically combining said recorded measurements.

4. The method of claim 3 where said step (d) further includes determining information about said key.

5. The method of claim 4 where said information about said key is usable to reduce an amount of effort required for a brute force attack against said key.

6. The method of claim 5 where said information about said key includes values of a plurality of key bits.

7. A method for evaluating the security of a cryptographic device to recover useful information about a key, said device containing at least said key and a circuit configured to perform cryptographic operations using said key, said method comprising:
- (a) connecting said device to an analog-to-digital converter configured to measure an amount of power consumed on an external power input to said device;
- (b) sending a plurality of command sequences to said device, where each said command sequence causes said device to perform a cryptographic operation to process data using said key;
- (c) during processing of each said cryptographic operation, recording a plurality of measurements of said power by using said analog-to-digital converter; and
- (d) determining whether information about said key is leaking from said device by statistically combining said recorded measurements.

8. The method of claim 7 where said cryptographic operation includes transforming with a block cipher.

9. The method of claim 8 where said block cipher includes DES.

10. The method of claim 9 where said data includes an input to said DES block cipher operation.

11. The method of claim 9 where said data includes an output from said DES block cipher operation.

12. A system for evaluating the security of a cryptographic hardware, comprising:
- (a) a device containing at least a key and a circuit configured to perform cryptographic operations using said key;
- (b) an analog-to-digital converter connected to said device and configured to measure an attribute related to operation of said device;
- (c) data storage system configured to record a plurality of measurements of said attribute, where said measurements are taken by said analog-to-digital converter during processing of each said cryptographic operation; and
- (d) statistical processing system for combining said measurements to determine whether information about said key is leaking from said device.

13. The system of claim 12 where said attribute includes electromagnetic radiation from said device.

14. The system of claim 12 where said attribute includes variations in an amount of power consumed on an external power input to said device.

15. The system of claim 14 where said cryptographic operation includes transforming using a block cipher.

16. The system of claim 13 where said element (d) is configured to determine information about said key.

17. The system of claim 12 further comprising a data filtering system configured to temporally align data points corresponding to a point of interest within said plurality of measurements.

18. A method for analyzing externally measurable characteristics of a cryptographic device, said device containing a secret key and configured to perform cryptographic operations with said key, to recover information about said key, said method comprising:
- (a) connecting said device to an analog-to-digital converter configured to measure said characteristic during operation of said device;
- (b) during a said cryptographic operation, using said analog-to-digital converter to measure a plurality of measurements of said attribute;
- (c) storing said set of measurements in a memory;
- (d) repeating said (b) and (c) a plurality of times to produce a plurality of sets;
- (e) computing the alignment of said measurements in said plurality of sets such that measurements corresponding to a single point of interest can be compared;
- (f) generating a guess of a value of a portion of said key;
- (g) using said guess, computing an average of a subset of said aligned measurements; and
- (h) verifying correctness of said guess by detecting existence of a bias in said average.

19. The method of claim 18 where said characteristic is an amount of power consumed on an external power input to said device.

* * * * *